United States Patent
Stahl

(10) Patent No.: US 10,885,632 B1
(45) Date of Patent: Jan. 5, 2021

(54) CAMERA CALIBRATION SYSTEM

(71) Applicant: AMAZON TECHNOLOGIES, INC., Reno, NV (US)

(72) Inventor: Joachim Sebastian Stahl, Sammamish, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 610 days.

(21) Appl. No.: 14/471,612

(22) Filed: Aug. 28, 2014

(51) Int. Cl.
*G01B 11/24* (2006.01)
*G06T 7/00* (2017.01)
*H04N 7/18* (2006.01)

(52) U.S. Cl.
CPC ............ *G06T 7/0018* (2013.01); *H04N 7/18* (2013.01); *G06T 2207/10004* (2013.01); *G06T 2207/20024* (2013.01); *G06T 2207/20036* (2013.01); *G06T 2207/30232* (2013.01)

(58) Field of Classification Search
None
See application file for complete search history.

(56) References Cited

U.S. PATENT DOCUMENTS

| 5,901,236 | A | * | 5/1999 | Mizui | G01C 15/00 |
| | | | | | 382/103 |
| 7,225,980 | B2 | | 6/2007 | Ku et al. | |
| 7,949,568 | B2 | | 5/2011 | Fano et al. | |
| 8,009,864 | B2 | | 8/2011 | Linaker et al. | |
| 8,189,855 | B2 | | 5/2012 | Opalach et al. | |
| 8,630,924 | B2 | | 1/2014 | Groenevelt et al. | |
| 9,235,928 | B2 | | 1/2016 | Medioni et al. | |
| 2003/0038933 | A1 | * | 2/2003 | Shirley | G01B 11/25 |
| | | | | | 356/243.1 |
| 2005/0219364 | A1 | * | 10/2005 | DiCarlo | H04N 1/401 |
| | | | | | 348/188 |
| 2006/0218057 | A1 | * | 9/2006 | Fitzpatrick | G06Q 10/04 |
| | | | | | 705/28 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Mohammed S Rahaman
(74) *Attorney, Agent, or Firm* — Lindauer Law, PLLC

(57) ABSTRACT

Cameras may be used to acquire information about objects in three-dimensional (3D) space. Described herein are techniques for determining a calibration between pixel coordinates in a two-dimensional image acquired by the camera and coordinates in the 3D space. In one implementation, the target assembly is positioned at a known 3D location and particular optical targets thereon having known 3D coordinates are activated sequentially. Images are acquired and processed to determine the pixel coordinates of the respective optical targets. Calibration data, such as a transformation matrix, is generated based on the information about which optical target is active in a given acquired image, the pixel coordinates of the optical target in that acquired image, and the known 3D coordinates of the individual optical target.

20 Claims, 9 Drawing Sheets

(56) References Cited

U.S. PATENT DOCUMENTS

| | | |
|---|---|---|
| 2008/0219573 A1* | 9/2008 | Lu .................. H04N 19/61 |
| | | 382/236 |
| 2011/0011936 A1 | 1/2011 | Morandi et al. |
| 2012/0284132 A1 | 11/2012 | Kim et al. |
| 2013/0284806 A1 | 10/2013 | Margalit |
| 2015/0086107 A1 | 3/2015 | Dedeoglu et al. |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011, Retrieved from Internet: <URL:http://www.researchgate.net/publication/221568350_How_to_nudge_in_Situ_designing_lambent_devices_to_deliver_salient_information_in_supermarkets>.

Pop, Christian, "Introduction to the BodyCom Technology", AN1391, DS01391A, Microchip Technology, Inc., May 2, 2011.

\* cited by examiner

CAMERA CALIBRATION SYSTEM

BACKGROUND

Retailers, wholesalers, and other product distributors typically maintain an inventory of various items that may be ordered, purchased, leased, borrowed, rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility. This monitoring may be provided using sensors, such as cameras.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
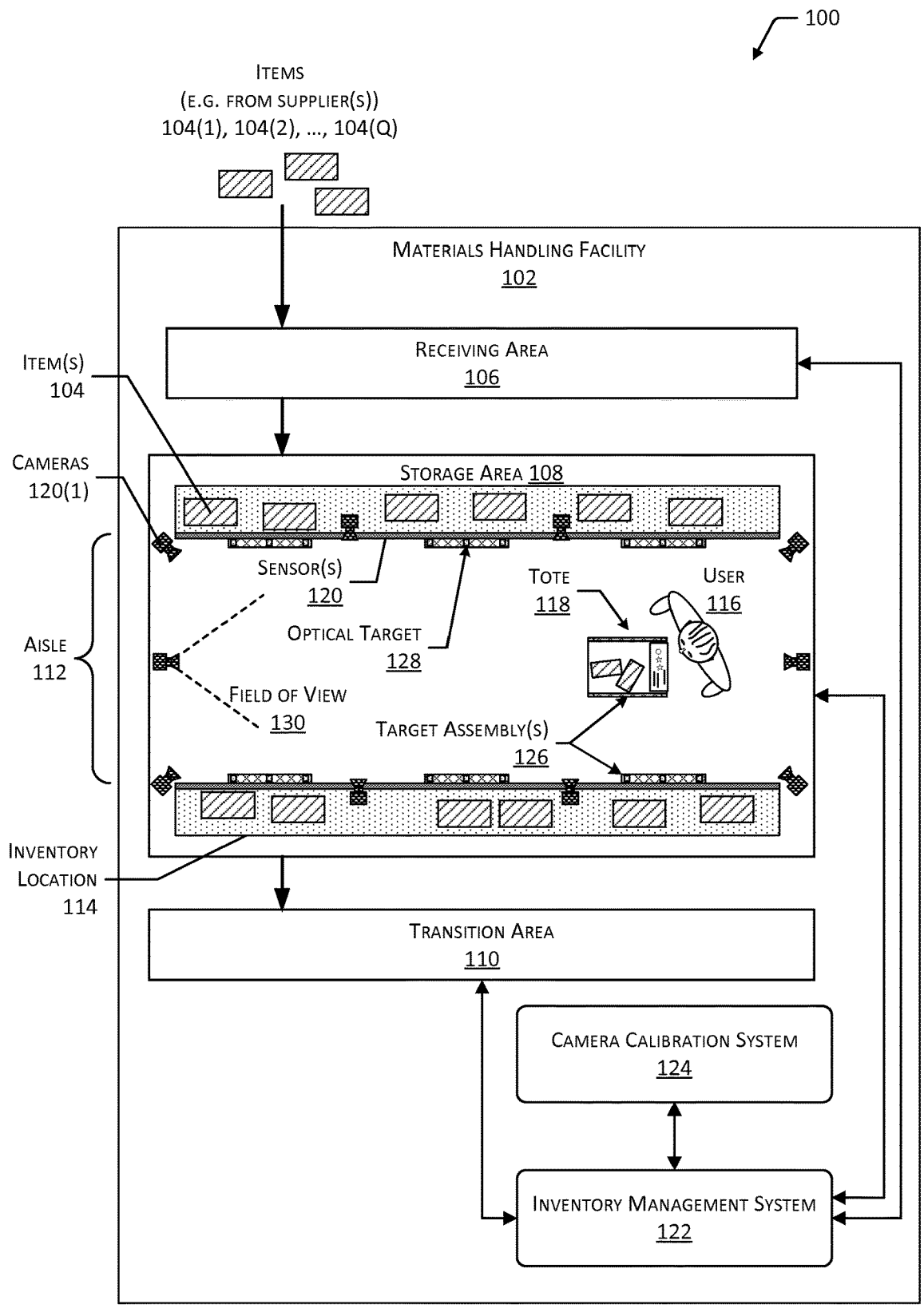
FIG. 1 is a block diagram illustrating a materials handling facility having cameras configured to be calibrated using one or more target assemblies, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for calibrating cameras which may be used in a materials handling facility (facility) or other setting. The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. Operation of the facility may be facilitated by using one or more cameras to acquire images of objects in the facility. A calibration process provides an association between particular pixels in an image acquired from the camera with a particular location in three-dimensional (3D) space.

The facility may include a materials handling facility, library, museum, and so forth. As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. The systems and techniques described in this disclosure may also be used in other settings.

As described herein, camera calibration generates calibration data which specifies a relationship between pixels at particular pixel coordinates in an image acquired by the camera with a particular location in 3D space, or a projection which includes that location. For example, the calibration data may include a transformation matrix indicating coordinates in the image (such as pixel coordinates in camera space) that correspond to particular location coordinates in 3D space (real space).

A target assembly is located within at least a portion of a field of view of the camera. The target assembly includes one or more optical targets in known locations. The optical targets are configured to transition between a plurality of states which are detectable by the camera. For example, the optical targets may include light emitting diodes (LEDs) or other lights which may be toggled between an active "on" state in which light is emitted, and an inactive "off" state in which light is not emitted.

The target assembly, the camera, and a server or other device may be in communication with one another. For example, a network may connect these three devices. The server or other device may be configured to manage the calibration process as described herein. For example, the server may send instructions to particular optical assemblies to activate particular optical targets, to particular cameras to acquire images, and so forth.

During the calibration process, the server sends instructions setting the optical targets to a first state. For example, all of the optical targets may be set to inactive or "off". An instruction may be sent to the camera to acquire a base image while the optical targets are in the first state. In other implementations, the cameras may acquire images without instructions, and the server may retrieve these images from storage.

One or more particular optical targets then transition to a second state, such as active or "on". The optical targets may be active for a pre-determined period of time or may remain in a particular state until otherwise directed. In one implementation, a single optical target of the target assembly may be active at a given time. Images acquired by the camera while the optical targets are active are designated as active images.

Target pixels are those pixels which correspond to at least a portion of the optical target. Target coordinates indicate coordinates of the target pixels within the two-dimensional (2D) active images. For example, where the optical target comprises an LED, the pixel which represents the lit LED is the target pixel. In some implementations, the optical target may be represented by more than one pixel. For example, where the active image exhibits a "blooming" effect from the optical target, a set of target pixels may be representative of the optical target.

The target coordinates may be determined by comparing the base image with the active image. For example, pixel values (such as intensity) for the pixels in the active image may be subtracted from the respective pixels in the base image (or vice versa) to produce a difference image comprising difference pixels.

One or more filters may be applied to the difference image. In one implementation, pixel values of the difference pixels in the difference image may be compared with a threshold value. The difference pixels which are above a threshold value may be designated as the target pixels. Continuing the example, the difference pixel representing the lit LED may have an intensity which is above the threshold value, and thus is designated a target pixel. In other implementations, other comparison or processing techniques may be used to determine the target pixels. For example, the target pixels may be determined by comparing a distance in color space between pixels in the base image and the active image. Similarly, other filtering techniques may be applied, such as the application of one or more of a median filter, a morphological filter, and so forth. In one implementation, the morphological filter may perform one or more of a dilation function, an erosion function, or other function. Dilation and erosion perform morphological operations by evaluating a pixel based on adjacent pixels. Dilation may add pixels to the boundaries of objects in an image, while erosion removes pixels on object boundaries. For example, the "dilate" and "erode" functions found in OpenCV may be applied to remove "salt and pepper" noise in the difference image which comprises the difference pixels.

In some implementations the set(s) of target pixels or cluster may be determined. For example, a cluster of pixels having a larger number of pixels than any other cluster may be determined to be the target pixels. In one implementation, the OpenCV "kmeans" function may be used to determine clusters.

The active optical targets may be deactivated, and another optical target may be activated while additional active images are acquired. As the process continues, the active images acquired depict different optical targets in their active state.

These active images are processed as described above, to determine the particular target pixels that correspond to particular optical targets. The pixel coordinates of the target pixel may then be associated with the known location of the corresponding optical target, generating calibration data. In some implementations, the calibration data may be expressed using a transformation matrix or other data structure. The calibration data may be associated with the camera, which provided the base images and active images.

During subsequent processing of images as acquired by the camera for which the calibration data is now available, the location of a particular pixel in the 2D space of the image may be associated with a location or a projection into 3D space. For example, the pixel coordinates of the pixel at (x=5, y=4) in an image may correspond to a projection in 3D space which includes the real coordinates of (x=11 meters, y=5 meters, z=3 meters).

Multiple cameras may be calibrated simultaneously using the techniques described above. For example, a particular sequence of optical target activation and deactivation may be viewed and stored as image data by any number of cameras.

Calibration assemblies may be incorporated into various objects or devices in the facility. For example, the calibration assemblies may be placed on the front of shelves, on totes, on robots, and so forth. Continuing the example, a robot incorporating a calibration assembly may be directed to different locations within the facility to provide output from the optical targets.

By utilizing these techniques, camera calibration may be accomplished without regard to synchronization between the optical targets and the cameras. As a result, the overall system is simplified and less prone to error.

Furthermore, by providing temporal separation between the activation of particular optical targets, overall system complexity is reduced. For example, by only activating a single optical target LED at a time, there is no need to modulate the light from the LED, use a particular color, and so forth, to distinguish one optical target on the target assembly from another.

By spreading out the sequence of particular optical target states over time, the identity of a particular optical target which appears as a target pixel within the active image is unambiguous. For example, the server stores data indicating that at timestamp 140526160602, the optical target at real coordinates (11, 5, 3) was active. As a result, the pixel coordinates of (5, 4) for the active image at the same timestamp, or within a threshold time window, correspond to the optical target at real coordinates (11, 5, 3) and no other. As used herein, a timestamp may include a date, time, combination of date and time, tick, sequence number, and so forth.

By using the techniques and systems described herein, calibration data is available for other use. For example, the calibration data may be used by an image processing system configured to determine a location in real coordinates of a user or a tote in the camera's field of view. The location information may be used to track objects such as items of inventory, totes, users, and so forth, or provide other services to users or processes of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's structure, or may be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116 and totes 118 or other material handling apparatus may move within the facility 102. For example, the user 116 may move about within the facility 102 to pick or place the items 104 in various inventory locations 114, placing them on the tote 118 for ease of transport. In other implementations, other devices such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras, 3D sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking the location of objects within the facility 102, their movement, and so forth. For example, a series of images acquired by the camera 120(1) may indicate removal of an item 104 from a particular inventory location 114 by the user 116 and placement of the item 104 on or at least partially within the tote 118. The tote 118 is discussed in more detail below with regard to FIG. 5.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of thing, depending on the nature of the enterprise that operates the facility 102.

Upon being received from a supplier at receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, in one implementation, a user 116 may have a list of items 104 they desire and may progress through the facility 102 picking items 104 from inventory locations 114 within the storage area 108, and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another, or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102.

During use of the facility 102, the user 116 may move about the facility 102 to perform various tasks, such as picking or placing the items 104 in the inventory locations 114. The user 116 may benefit from information or actions which are based on input from calibrated cameras 120(1). For example, a pick list may be presented to the user 116 for items 104 which are in inventory locations 114 proximate to the location of the user 116.

The inventory management system 122 may access or generate sensor data about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data of scenes in the facility 102. The image data may be processed by the inventory management system 122 to determine a location of the user 116, the tote 118, identity of the user 116, and so forth. The sensors 120 are discussed in more detail below with regard to FIG. 2.

The inventory management system 122 may utilize a camera calibration system 124. The camera calibration system 124 is configured to generate calibration data which relates pixel coordinates of pixels in images acquired by cameras 120(1) to locations in real space. In some implementations, the calibration data associates the pixel coordinates with a projection which may include a location in real space. The relationship between pixel coordinates and real coordinates in 3D space are discussed in more detail below with regard to FIG. 3.

The facility 102 includes one or more target assemblies 126, with each target assembly 126 having one or more optical targets 128. The target assembly 126 provides a structure to which the optical targets 128 are affixed and maintained at particular locations in real space. In some implementations, the target assembly 126 may be incorporated into, or part of, other devices such as shelves acting as inventory locations 114, the totes 118, robots, and so forth. The cameras 120(1) exhibit a field of view 130, which is a portion of the facility 102 detected and included in an image produced by the camera 120(1). The field of view 130 may include one or more target assemblies 126, and the corresponding one or more optical targets 128.

The optical targets 128 are configurable to provide at least two states which are distinguishable by the cameras 120(1). These states may or may not be distinguishable to the unaided human eye. For example, the optical targets 128 may emit or modify infrared light but not visible light. The optical targets 128 may be configured to emit light or modify incident ambient light. The optical targets 128 may include emissive elements such as light emitting diodes (LEDs), light emitting quantum dots, fluorescent lights, electroluminescent lights, and so forth. For example, infrared or ultraviolet LEDs or other emitters may be used.

The optical targets 128 may also include non-emissive elements such as electrophoretic elements, liquid crystal elements, microelectromechanical elements, mechanical flags, and so forth which modify or interact with incident ambient light. The optical targets 128 are discussed in more detail below with regard to FIG. 2. The optical targets 128 may be configured to provide an unmodulated output. For example, the LED may be either "on" or "off", providing light with a continuous wave output during operations. In comparison, modulated output is configured to encode information, such as binary data.

The techniques and systems described herein may be used to calibrate other sensors 120. For example, 3D sensors such as a lidar system, or a range camera may be calibrated.

By generating the calibration data, the camera calibration system 124 allows the cameras 120(1) or other sensors 120 to provide information about the location of objects in the facility 102 to the inventory management system 122. The inventory management system 122 may use this information to track objects, update information about inventory levels, provide information to the users 116, and so forth.

Figure 2:
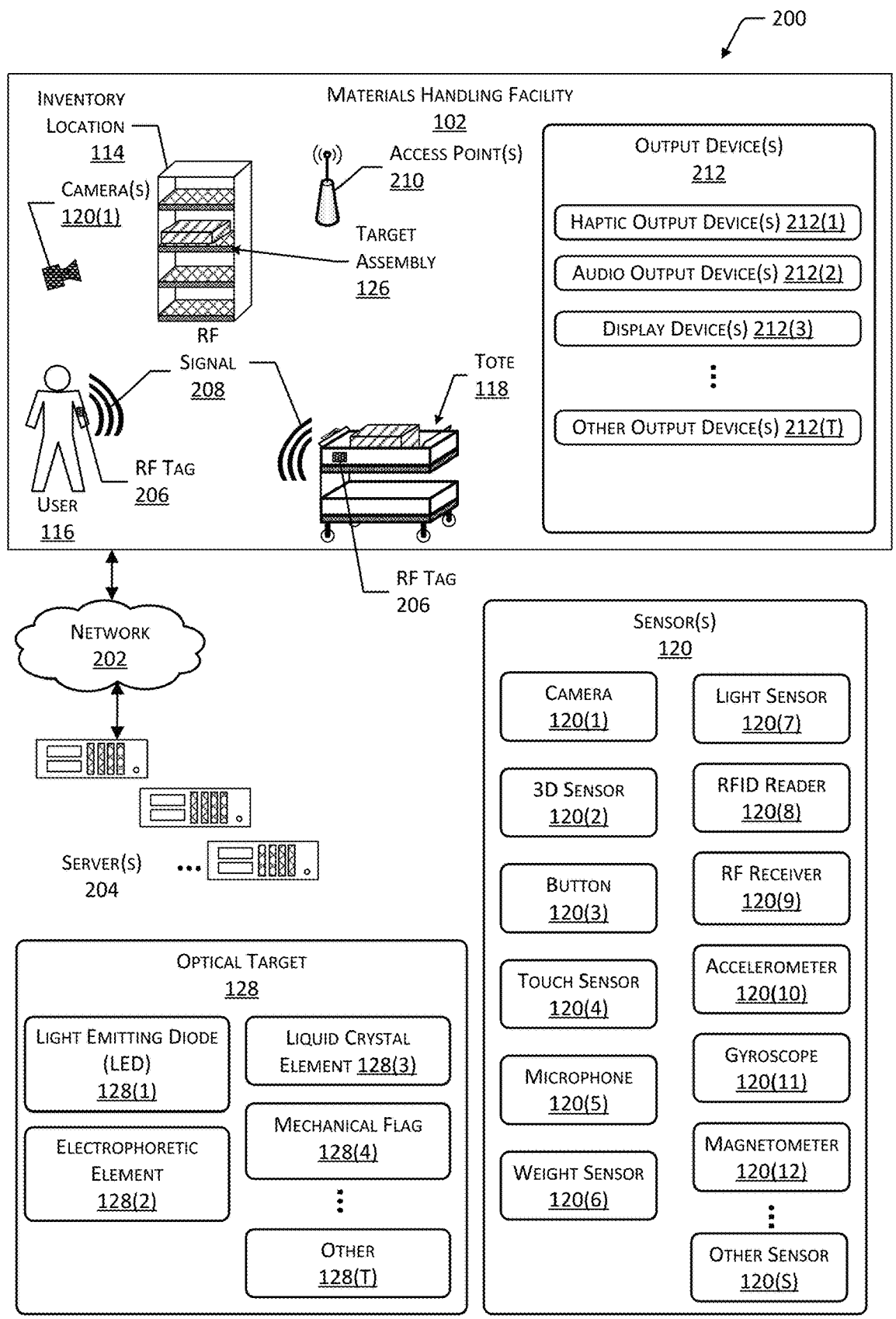
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122, the camera calibration system 124, and so forth. While the servers 204 are illustrated as being in a location outside of the facility 102, in other implementations, at least a portion of the servers 204 may be located at the facility 102. The servers 204 are discussed in more detail below with regard to FIG. 6.

The users 116, the totes 118, or other objects in the facility 102 may be equipped with one or more radio frequency (RF) tags 206. The RF tags 206 are configured to emit an RF signal 208. In one implementation, the RF tag 206 may be a radio frequency identification (RFID) tag configured to emit the RF signal 208 upon activation by an external signal. For example, the external signal may comprise a radio frequency signal or a magnetic field configured to energize or activate the RFID tag. In another implementation, the RF tag 206 may comprise a transmitter and a power source configured to power the transmitter. For example, the RF tag 206 may comprise a Bluetooth Low Energy (BLE) transmitter and battery. In other implementations, the tag may use other techniques to indicate presence of the tag. For example, an acoustic tag may be configured to generate an ultrasonic signal which is detected by corresponding acoustic receivers. In yet another implementation, the tag may be configured to emit an optical signal.

The inventory management system 122 may be configured to use the RF tags 206 for one or more of identification of the object, determining a location of the object, and so forth. For example, the users 116 may wear RF tags 206, the totes 118 may have RF tags 206 affixed, and so forth, which may be read and, based at least in part on signal strength, used to determine identity and location. The tote 118 is configured to carry or otherwise transport one or more items 104. For example, the tote 118 may include a basket, a cart, a bag, and so forth. The tote 118 is discussed in more detail below with regard to FIG. 5.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth.

The sensors 120 may include one or more cameras 120(1). These cameras 120(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 122 may use image data acquired by the cameras 120(1) during operation of the facility 102. For example, the inventory management system 122 may identify items 104, users 116, totes 118, and so forth, based at least in part on their appearance within the image data acquired by the cameras 120(1). The camera calibration system 124 may be used to generate calibration data about the cameras 120(1). The cameras 120(1) may be mounted in various locations within the facility 102. For example, cameras 120(1) may be mounted overhead, on inventory locations 114, may be worn or carried by users 116, may be affixed to totes 118, and so forth.

One or more 3D sensors 120(2) may also be included in the sensors 120. The 3D sensors 120(2) are configured to acquire spatial or three-dimensional data, such as depth information, about objects within a sensor field-of-view. The 3D sensors 120(2) include range cameras, lidar systems, sonar systems, radar systems, structured light systems, stereo vision systems, optical interferometry systems, and so forth. The lidar system may include a laser, a detector suitable for the light generated by the laser, and an optical scanning assembly. The optical scanning assembly may be configured to direct a beam of light from the laser to a plurality of points in 3D real space, and direct laser light as reflected or fluoresced by an object at the plurality of points back to the detector. The lidar system or other 3D sensors 120(2) may be configured to generate sets of coordinates in 3D real space of the target assembly 126, the optical targets 128, or a portion thereof or associated therewith.

The inventory management system 122 may use the three-dimensional data acquired to identify objects, determine a location of an object in 3D real space, and so forth. For example, the camera calibration system 124 may use the lidar to determine the location of the target assembly 126, individual optical targets 128, and so forth, in 3D real space.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116, and send information indicative of this input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7). The light sensors 120(7) may be configured to provide information associated with ambient lighting conditions such as a level of illumination. Information acquired by the light sensors 120(7) may be used by the camera calibration system 124. For example, the intensity of illumination provided by an emissive optical target 128 may be adjusted responsive to the level of lighting present in the facility 102.

One or more radio frequency identification (RFID) readers 120(8), near field communication (NFC) systems, and so forth, may also be included as sensors 120. For example the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and different RFID readers 120(8) having locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi, Bluetooth, ZigBee, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10). In one implementation, such as where the target assembly 126 is incorporated into or affixed to a tote 118 or robot, accelerometers 120(10) may be used to confirm that the target assembly 126 is motionless during calibration.

A gyroscope 120(11) provides information indicative of rotation of an object affixed thereto. For example, the tote 118 or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented. Continuing the example above, the magnetometer 120(12) on the target assembly 126 may provide information indicative of the orientation of the target assembly 126.

The sensors 120 may include other sensors 120(S) as well. For example, the other sensors 120(S) may include proximity sensors, ultrasonic rangefinders, thermometers, barometric sensors, hygrometers, or biometric input devices including but not limited to fingerprint readers or palm scanners. For example, the inventory management system 122 may use information acquired from thermometers and hygrometers in the facility 102 to direct the user 116 to check on delicate items 104 stored in a particular inventory location 114 which is overheating, too dry, too damp, and so forth.

In some implementations, the camera 120(1) or other sensors 120 may include hardware processors, memory, and other elements configured to perform various functions. For example, the cameras 120(1) may be configured to generate image data, send the image data to another device such as the server 204, and so forth.

The facility 102 may include one or more access points 210 configured to establish one or more wireless networks. The access points 210 may use Wi-Fi, near field communication (NFC), Bluetooth, or other technologies to establish wireless communications between a device and the network 202. The wireless networks allow the devices to communicate with one or more of the sensors 120, the inventory management system 122, the camera calibration system 124, the target assemblies 126, the RF tag 206, a communication device of the tote 118, or other devices.

Output devices 212 may also be provided in the facility 102. The output devices 212 are configured to generate signals which may be perceived by the user 116. In some implementations, the output devices 212 may be used as optical targets 128. In other implementations, the optical targets 128 may be used as output devices 212 as well.

Haptic output devices 212(1) are configured to provide a signal which results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal which produces an apparent tactile sensation in one or more fingers of the user 116. In another example, the haptic output devices 212(1) may comprise piezoelectric or rotary motor devices configured to provide a vibration which may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to: voice coils, piezoelectric elements, magnetostrictive elements, or electrostatic elements, and so forth. For example, a piezoelectric buzzer or a speaker may be used to provide acoustic output.

The display devices 212(3) may be configured to provide output which may be seen by the user 116, or detected by a light-sensitive detector such as a camera 120(1) or light sensor 120(7). The output may be monochrome or color. The display devices 212(3) may be emissive, reflective, or both. An emissive display device 212(3), such as using LEDs, is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display mechanisms may include, but are not limited to, microelectromechanical systems (MEMS), spatial light modulators, electroluminescent displays, quantum dot displays, liquid crystal on silicon (LCOS) displays, cholesteric displays, interferometric displays, liquid crystal displays, electrophoretic displays, and so forth. These mechanisms are configured to emit light, modulate incident light emitted from another source, or both. The display devices 212(3) may operate as panels, projectors, and so forth.

The display devices 212(3) may be configured to present images. For example, the display devices 212(3) may comprise a pixel-addressable display. The image may comprise at least a two-dimensional array of pixels, or a vector representation of an at least two-dimensional image.

In some implementations, the display devices 212(3) may be configured to provide non-image data, such as text characters, colors, and so forth. For example, a segmented electrophoretic display device 212(3), segmented LED, and so forth, may be used to present information such as a SKU number, a shape designated as an optical target 128, and so forth. The display devices 212(3) may also be configurable to vary the color of the segment, such as using multicolor LED segments.

The display devices 212(3) may be configurable to provide image or non-image output. For example, an electrophoretic display device 212(3) with addressable pixels may be used to present images of text information, or all of the pixels may be set to a solid color such as in a first state which is all black or a second state which is solid white.

Other output devices 212(T) may also be present. For example, the other output devices 212(T) may include scent/odor dispensers, document printers, three-dimensional printers or fabrication equipment, and so forth.

As described above, the optical targets 128 are configurable to provide at least two states which are distinguishable by the cameras 120(1). These states may or may not be distinguishable to the unaided human eye. For example, the optical targets 128 may emit or modify infrared light but not visible light. The optical targets 128 may be configured to emit light or modify incident ambient light. The optical targets 128 may include emissive elements such as LEDs 128(1), light emitting quantum dots, fluorescent lights, electroluminescent lights, and so forth. For example, infrared or ultraviolet LEDs or other emitters may be used.

The optical targets 128 may also include non-emissive elements such as electrophoretic elements 128(2), liquid crystal elements 128(3), microelectromechanical elements, mechanical flags 128(4), and so forth, which modify or interact with incident ambient light. The optical targets 128 may be configured to provide an unmodulated output. For example, the LED may be either "on" or "off", providing light with a continuous wave output during operations. In comparison, modulated output is configured to encode information, such as binary data. Other optical targets 128(T) may also be used, such as cholesteric elements, interferometric elements, and so forth.

In some implementations the display devices 212(3) may be used as optical targets 128. For example, the display device 212(3) such as an electrophoretic display or liquid crystal display may be configured to present images. Continuing the example, the first image may present a first state of solid black, while the second image may present a second state of a solid white.

The images presented by the display devices 212(3) or optical targets 128 for use during calibration may also include more complex patterns. For example, the images may comprise one or two dimensional barcodes. Continuing the example, an electrophoretic display device 212(3) may present a two-dimensional pattern containing multiple features which may be detected and used for calibration.

Figure 3:
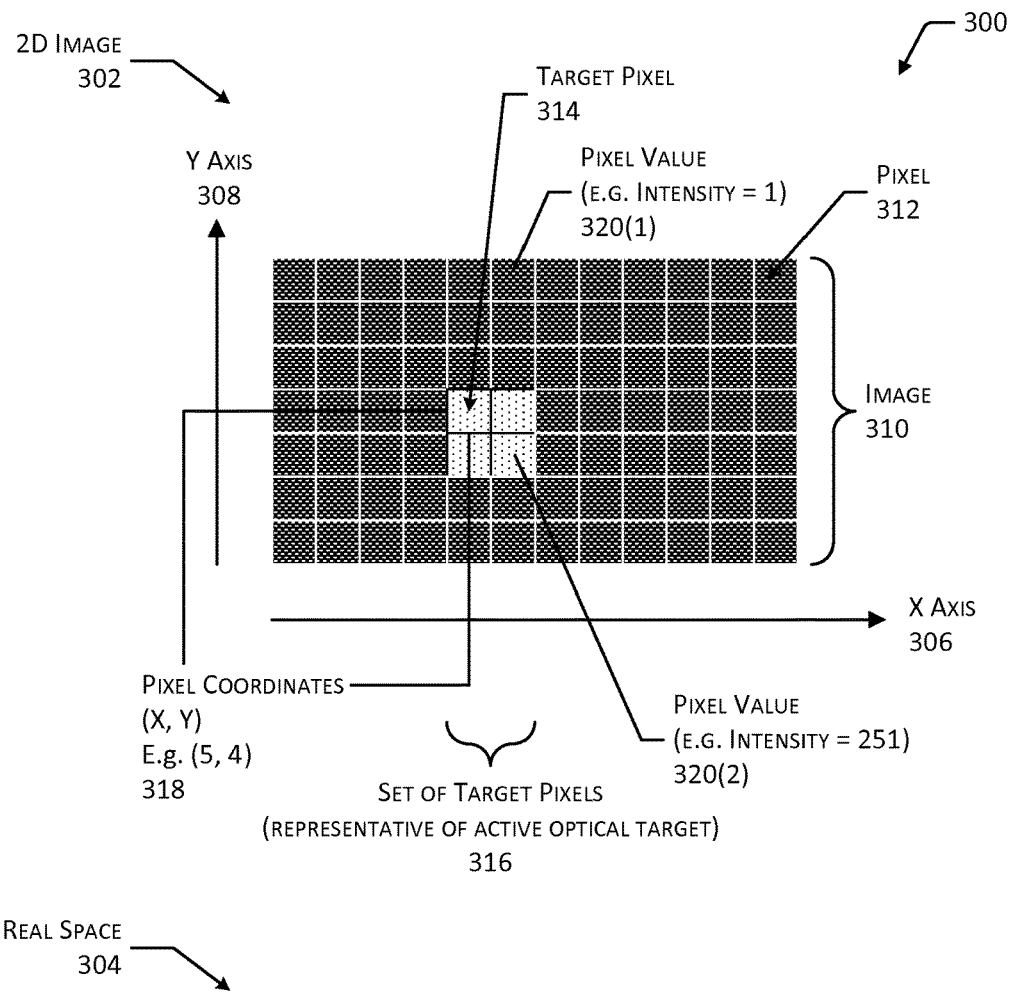
FIG. 3 illustrates schematics of pixel coordinates in an image acquired by a camera and real coordinates corresponding to a location in three-dimensional (3D) space.
Figure 3:
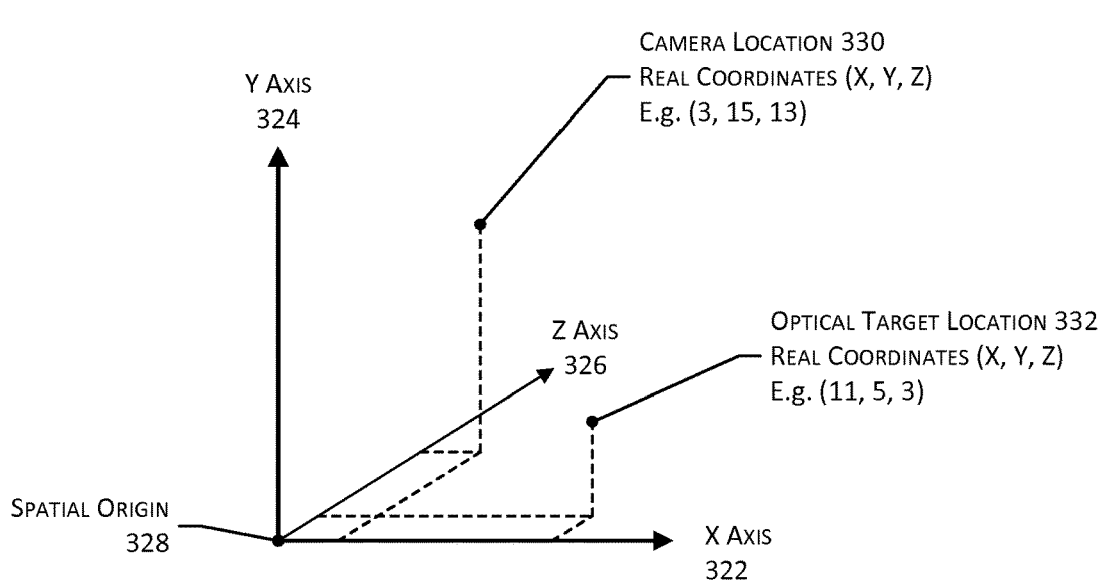

FIG. 3 illustrates schematics 300 of a 2D image 302 as acquired by the camera 120(1) and real space 304 corresponding to a location in 3D space.

The 2D image 302 is acquired by the camera 120(1). With regard to the 2D image 302, a horizontal X axis 306 and a perpendicular Y axis 308 are depicted by way of illustration. An image 310 is also shown comprising a plurality of picture elements, or pixels 312. The pixels 312 are arranged in an arrangement of rows extending along the X axis 306 and columns extending along the Y axis 308. In other implementations, other non-Cartesian arrangements may be used.

Some pixels 312 correspond to an optical target 128 which is active and within the field of view 130. A target pixel 314 is a pixel that corresponds to at least a portion of the optical target 128 which is active. For example, the target pixel 314 may be a bright spot resulting from the active LED light which is the optical target 128. In some implementations, the optical target 128 may be a portion of the image 310 which exceeds a single pixel. For example, the optical target 128 may be physically large enough to have an angular width greater than a single pixel 312. In another example, the camera 120(1) may experience effects such as optical blooming in which one or more pixels of an image sensor are saturated, and thus the signal from those one or more pixels "spills over" into adjacent pixels. A set of target pixels 316 may be designated. In this illustration, the portion of the image 310 corresponding to the optical target 128 which is active comprises a square of two pixels wide by two pixels tall. In some implementations, the pixel coordinates of the set of target pixels 316 may be the pixel coordinates associated with a geometric center of the set of target pixels 316, one or more corners of a polygon encompassing the target pixels 314, and so forth. Where the geometric center falls between pixel coordinates 318, the pixel coordinates 318 used may be shifted along the X axis 306, the Y axis 308, or both. The geometric center, also known as a centroid, is an arithmetic mean of all points or pixels 312 in the set of target pixels 316.

Each pixel 312 may be described by, or have associated with it, several attributes including pixel coordinates 318 and one or more pixel values 320. The pixel coordinates 318 indicate the relative position of a particular pixel 312 within the image 310. The pixel coordinates 318 may be expressed in terms of X and Y coordinates. For example, one of the target pixels 314 may have the pixel coordinates of (5, 4) relative to an origin at the bottom left of the image 310.

The pixel values 320 may be representative of one or more of a brightness channel, a red channel, a green channel, a blue channel, a luminance channel, a chrominance channel, and so forth. Each channel designates a particular range of wavelengths or a center wavelength for which that channel is representative of. For example, a color image may comprise pixels having red, green, and blue channels, while a monochrome image may comprise an intensity channel. In the example depicted here, the image 310 is monochrome, and each pixel 312 has pixel coordinates 318 and a pixel value 320 indicative of intensity. For example, where the intensity scale extends from an intensity of 0 representing solid black to 255 representing solid white, the dark pixels in this illustration such as at pixel coordinates 318 of (6, 7) have an intensity of 1, while the light pixels such as at pixel coordinates 318 of (6, 3) have an intensity of 251. The pixel values 320 may be expressed in binary, decimal, hexadecimal, or other forms. The pixel values 320 may also exhibit a position in a color space. In some implementations, the image 310 may be represented as an n-tuple matrix. For example, in the monochrome example here, a 3-tuple matrix comprising the X and Y pixel coordinates 318 and the intensity of each pixel 312 may be used to represent the image 310.

In comparison to the image 310 which is a two-dimensional representation of an image 310 in the field of view 130, the real space 304 corresponds to three-dimensional space and provides information indicative of location of objects in real space 304. Locations in real space 304 may be described using many different coordinate systems. In this illustration, coordinates in real space 304 are located with regard to three mutually orthogonal axes, an X axis 322, a Y axis 324, and a Z axis 326 having a common spatial origin 328.

Each camera 120(1) or other sensor 120 has a defined location in space at any given time. The location may be specified in terms of coordinates along the X, Y, and Z axes. For example, the camera 120(1) may have a camera location 330 at the real coordinates of (3, 15, 13) as measured in meters from the spatial origin 328. Each camera 120(1) may further have a particular orientation, such as yaw, pitch, roll, and so forth.

Other objects, such as the optical targets 128 or other portions of the target assemblies 126 have particular locations in space which may be expressed as real coordinates. For example, the optical target 128 may have an optical target location 332 at the real coordinates of (11, 5, 3).

Prior to calibration of the cameras 120(1), the real coordinates of objects may be determined using a variety of techniques such as a previously calibrated 3D sensor 120(2), manual measurement, and so forth. For example, the target assembly 126 may be located at a particular inventory location 114 such as a shelf, at a pre-determined height and position relative to the spatial origin 328. As a result, the real coordinates of the target assembly 126 are known. Furthermore, once the coordinates indicating the location of the target assembly 126 are known, given information about the physical configuration of the target assembly 126, the optical target 128 locations may also be determined. For example, the facility 102 may be represented in a three-dimensional computer aided design (CAD) format which includes the position of the cameras 120(1), the inventory locations 114, the target assemblies 126, the optical targets 128, and so forth. By using this information, the real space location of the optical target 128 may be determined.

Figure 4:
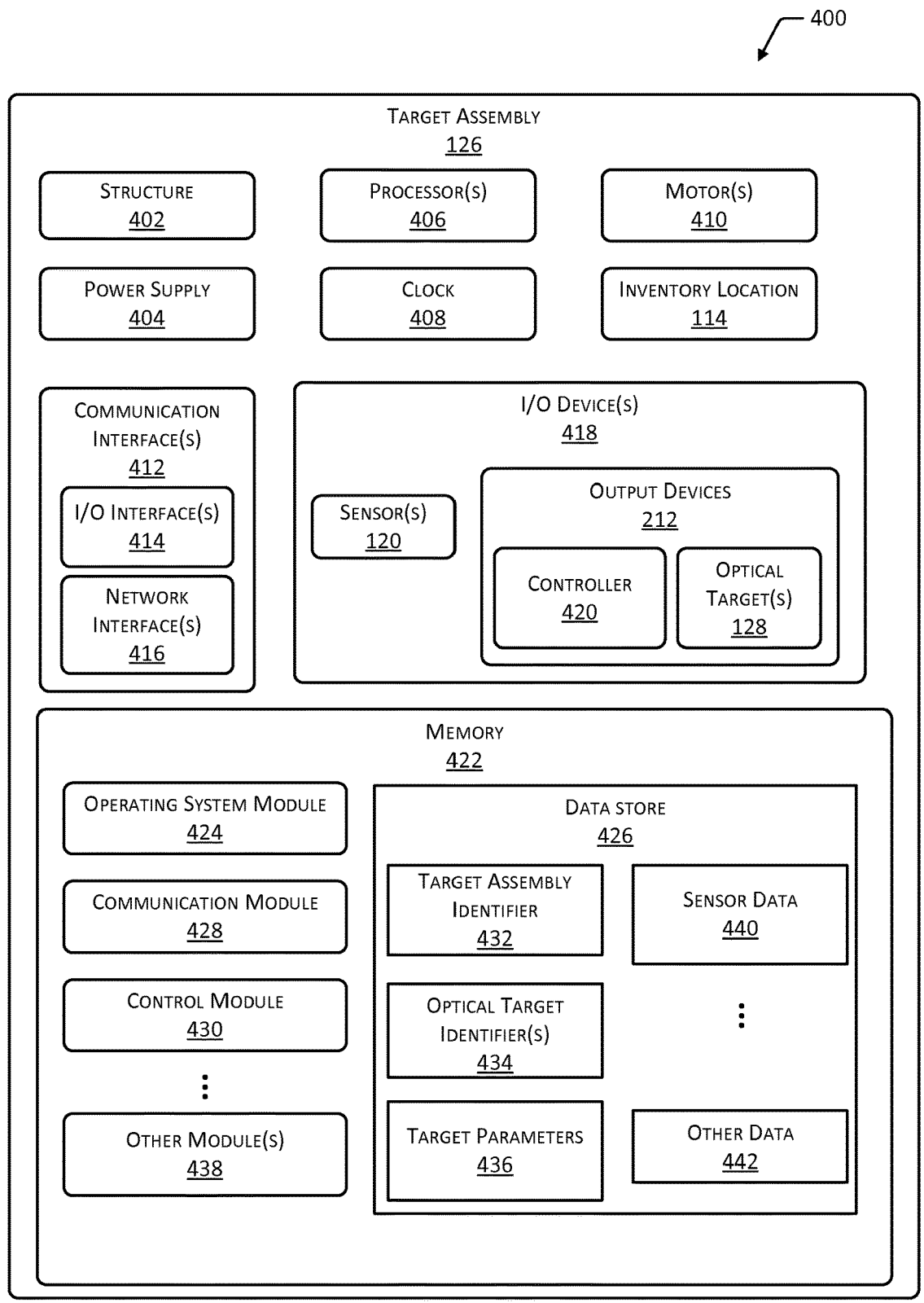
FIG. 4 illustrates a block diagram of a target assembly, according to some implementations.

FIG. 4 illustrates a block diagram 400 of the target assembly 126, according to some implementations. The target assembly 126 may comprise a structure 402. The structure 402 may include components comprising one or more of metal, plastic, composite materials, ceramic, wood, and so forth. For example, the structure 402 may comprise a carbon-fiber frame.

The target assembly 126 may include a power supply 404. The power supply 404 is configured to provide electrical power suitable for operating the components in the target assembly 126, or coupled thereto. For example, the power supply 404 may comprise batteries, capacitors, fuel cells, photovoltaic cells, wireless power receivers, conductive couplings suitable for attachment to an external power source, and so forth.

The target assembly 126 may include one or more hardware processors 406 (processors) configured to execute one or more stored instructions. The processors 406 may comprise one or more cores. One or more clocks 408 may provide information indicative of date, time, ticks, and so forth. For example, the processor 406 may use data from the clock 408 to generate a timestamp, trigger a preprogrammed action, and so forth.

In some implementations, the target assembly 126 may include one or more motors 410 or other motive devices. The motor 410 may be configured to move the target assembly 126 within the facility 102, or move a portion thereof. For example, in one implementation, the target assembly 126 may comprise a wheeled vehicle able to move within the facility 102 from one aisle 112 to another. In another example, the target assembly 126 may be semi-portable but have the optical targets 128 on one or more arms which may be rotated, translated, or otherwise moved by the motor 410.

The target assembly 126 may comprise one or more inventory locations 114. For example, the target assembly 126 may be incorporated into the shelving in the storage area 108, built into the totes 118, and so forth.

The target assembly 126 may include one or more communication interfaces 412 such as input/output (I/O) interfaces 414, network interfaces 416, and so forth. The communication interfaces 412 enable the target assembly 126, or components thereof, to communicate with other devices or components. The communication interfaces 412 may include one or more I/O interfaces 414. The I/O interfaces 414 may comprise inter-integrated circuit (I2C), serial peripheral interface bus (SPI), Universal Serial Bus (USB) as promulgated by the USB Implementers Forum, RS-232, and so forth.

The I/O interface(s) 414 may couple to one or more I/O devices 418. The output devices 212 may include one or more of the input devices such as the sensors 120. As described above, the sensors 120 may include cameras 120(1), buttons 120(3), touch sensors 120(4), accelerometers 120(10), gyroscopes 120(11), magnetometers 120(12), and so forth. The output devices 212 include a controller 420 and one or more optical targets 128. The controller 420 comprises circuitry to change the state of the optical targets 128 as instructed. For example, where the optical targets 128 comprise LEDs, the controller 420 may comprise a power supply, transistors, and other circuitry configured to accept an input and turn a particular LED corresponding to a particular optical target 128 "on" or "off". In some implementations, the output devices 212 may also include the haptic output devices 212(1), audio output devices 212(2), display devices 212(3), and so forth. For example, the target assembly 126 may be configured to emit an audible prompt such as a tone or beep while calibration is in process. In some embodiments, the I/O devices 418 may be physically incorporated with the target assembly 126 or may be externally placed.

The network interfaces 416 are configured to provide communications between the target assembly 126 and other devices, such as totes 118, routers, access points 210, the servers 204, and so forth. The network interfaces 416 may include devices configured to couple to personal area networks (PANs), local area networks (LANs), wide area networks (WANs), and so forth. For example, the network interfaces 416 may include devices compatible with Ethernet, Wi-Fi, Bluetooth, ZigBee, and so forth.

The target assembly 126 may also include one or more busses or other internal communications hardware or software that allow for the transfer of data between the various modules and components of the target assembly 126.

As shown in FIG. 4, the target assembly 126 includes one or more memories 422. The memory 422 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 422 provides storage of computer-readable instructions, data structures, program modules, and other data for the operation of the server 204. A few example functional modules are shown stored in the memory 422, although the same functionality may alternatively be implemented in hardware, firmware, or as a system on a chip (SOC).

The memory 422 may include at least one operating system (OS) module 424. The OS module 424 is configured to manage hardware resource devices such as the I/O interfaces 414, the I/O devices 418, the communication interfaces 412, and provide various services to applications or modules executing on the processors 406. The OS module 424 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 424 may be used, such as the Windows operating system from Microsoft Corporation of Redmond, Wash., the LynxOS from LynxWorks of San Jose, Calif., and so forth.

Also stored in the memory 422 may be a data store 426 and one or more of the following modules. These modules may be executed as foreground applications, background tasks, daemons, and so forth. The data store 426 may use a flat file, database, linked list, tree, executable code, script, or other data structure to store information. In some implementations, the data store 426 or a portion of the data store 426 may be distributed across one or more other devices including the servers 204, network attached storage devices, and so forth.

A communication module 428 may be configured to establish communications with one or more of the sensors 120, the servers 204, or other devices. The communications may be authenticated, encrypted, and so forth.

The memory 422 may also store a control module 430. The control module 430 is configured to respond to instructions to activate particular optical targets 128, provide information indicative of status of the target assembly 126, and so forth.

The control module 430 may access information in the data store 426, such as a target assembly identifier 432, optical target identifier 434, target parameters 436, or other data. The target assembly identifier 432 may comprise a string, value, or other data which uniquely identifies the particular target assembly 126 from other target assemblies 126 within at least a single facility 102. In some implementations, the target assembly identifier 432 may be unique across all facilities 102. In one implementation, the target assembly identifier 432 may comprise a media access control (MAC) address, such as that of the network interface 416.

The optical target identifier 434 may comprise a string, value, or other data which uniquely identifies the optical target 128 from other optical targets 128 within at least a single target assembly 126. In some implementations, the optical target identifier 434 may be unique across all target assemblies 126, at least within a single facility 102. For example, the target assembly 126 may include an 8 bit value, with a different 8 bit value assigned to each of the optical targets 128.

The target parameters 436 may comprise information including, but not limited to: a timestamp to activate the optical target 128, timestamp to deactivate the optical target 128, time duration to maintain a particular state of the optical target 128, intensity, pattern to display, and so forth. For example, the target parameters 436 may include a bitmap or other representation of a two-dimensional barcode, such as a QR code. In some implementations, the target parameters 436 may include sequence information indicating an order in which particular optical targets 128 are to be activated. For example, the sequence information may specify to activate optical targets 128 in the following order: 31, then 37, then 48, then 65, then 13, . . . , with a time duration of 100 milliseconds (ms) each. The sequence information may indicate that each optical target 128 is to be activated individually, with all other optical targets 128 deactivated.

The control module 430 may be configured to receive instructions which are addressed using the target assembly identifier 432, the optical target identifier 434, and the target parameters 436. For example, an instruction may be provided by the camera calibration system 124 which indicates that target assembly 126 "53:61:72:61" is to activate optical target identifier 434 with a value of "127" for 100 ms.

The control module 430 may include other functions, such as initializing the optical targets 128 all to a single state, such as all "off" or all "on". The control module 430 may also be configured to report information such as the current status of the optical targets 128, such as which optical targets 128 are in what states.

Other modules 438 may also be present in the memory 422. For example, a guidance module may be configured to direct operation of the motor 410 to move the target assembly 126 from one position within the facility 102 to another.

The data store 426 may also store sensor data 440. The sensor data 440 comprises information acquired by one or more of the sensors 120 of the target assembly 126. For example, the sensor data 440 may comprise information from the magnetometer 120(12) indicative of orientation of the structure 402. Other data 442 may also be stored within the data store 426. For example, configuration settings, pre-stored activation sequences, user interface preferences, and so forth, may be stored within the data store 426.

Figure 5:
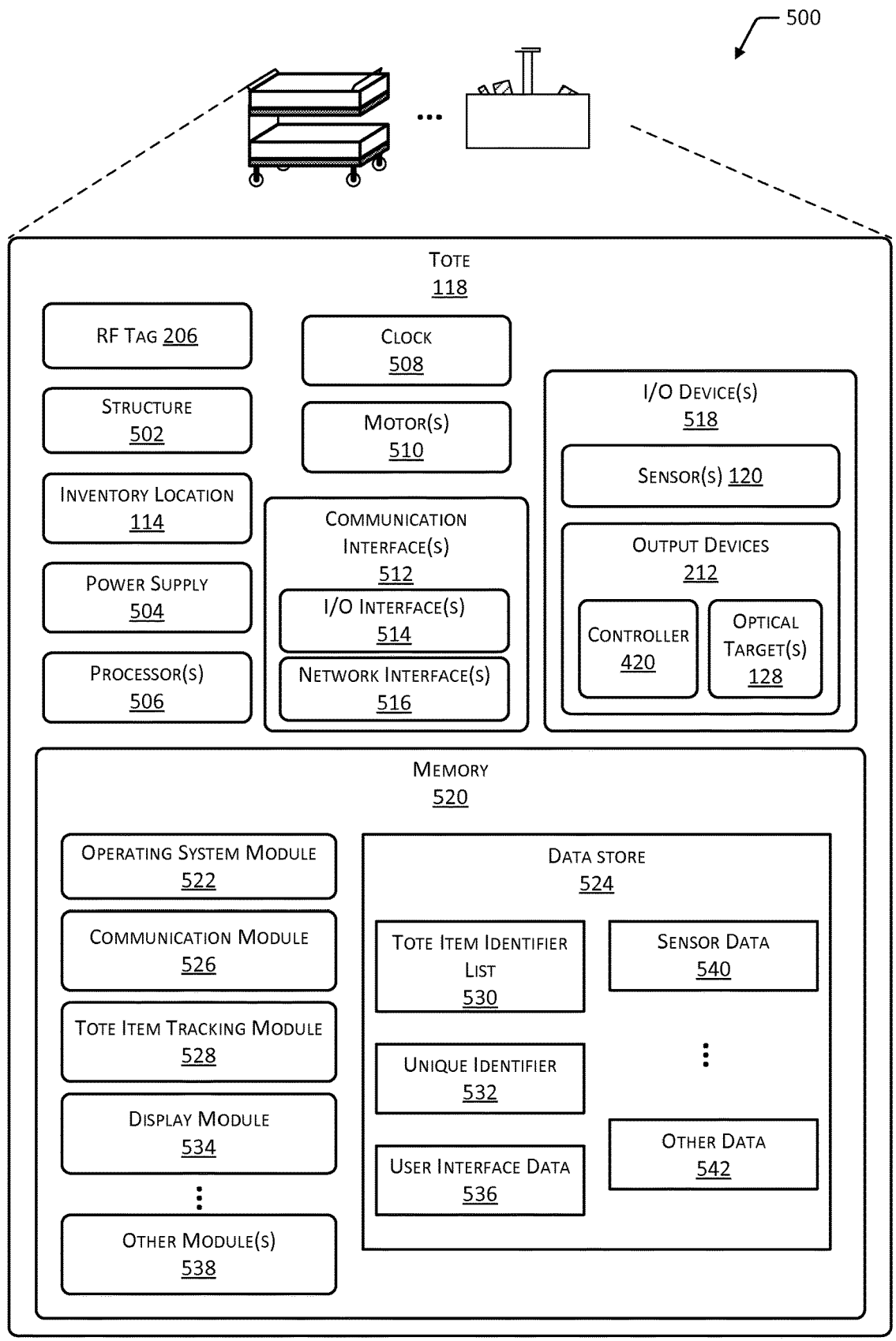
FIG. 5 illustrates a block diagram of a tote, according to some implementations.

FIG. 5 is a block diagram 500 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include an RF tag 206. The RF tag 206 may be affixed to, integral with, or otherwise associated with the tote 118. In some implementations, the tote 118 may have identifiers, tags, or other indicia thereupon. For example, a machine-readable optical code, such as a barcode, may be affixed to a side of the tote 118.

The tote 118 may comprise a structure 502. The structure 502 may include components comprising one or more of metal, plastic, composite materials, ceramic, wood, and so forth. For example, the structure 502 may comprise a carbon-fiber frame. One or more inventory locations 114 may be integral with, or attached to, the structure 502. For example, the structure 502 may comprise a frame with wheels while the inventory location 114 comprises a basket to hold one or more items 104 during use.

The tote 118 may include a power supply 504. The power supply 504 is configured to provide electrical power suitable for operating the components in the tote 118, or coupled thereto. For example, the power supply 504 may comprise batteries, capacitors, fuel cells, photovoltaic cells, wireless power receivers, conductive couplings suitable for attachment to an external power source, and so forth.

The tote 118 may include one or more hardware processors 506 (processors) configured to execute one or more stored instructions. The processors 506 may comprise one or more cores. One or more clocks 508 may provide information indicative of date, time, ticks, and so forth. For example, the processor 506 may use data from the clock 508 to generate a timestamp, trigger a preprogrammed action, and so forth.

In some implementations, the tote 118 may include one or more motors 510 or other motive devices. The motor 510 may be configured to move or assist the user 116 in moving the tote 118 from one location to another within the facility 102. For example, in one implementation, the tote 118 may comprise a wheeled vehicle able to move within the facility 102, such as from one aisle 112 to another.

The tote 118 may include one or more communication interfaces 512 such as I/O interfaces 514, network interfaces 516, and so forth. The communication interfaces 512 enable the tote 118, or components thereof, to communicate with other devices or components. The communication interfaces 512 may include one or more I/O interfaces 514. The I/O interfaces 514 may comprise I2C, SPI, USB, RS-232, and so forth.

The I/O interface(s) 514 may couple to one or more I/O devices 518. The I/O devices 518 may include one or more of the input devices such as the sensors 120. As described above, the sensors 120 may include cameras 120(1), buttons 120(3), touch sensors 120(4), accelerometers 120(10), gyroscopes 120(11), magnetometers 120(12), and so forth.

The I/O devices 518 may include the output devices 212 such as the haptic output devices 212(1), audio output devices 212(2), display devices 212(3), and so forth. For example, the tote 118 may comprise a display device 212(3) configured to present a graphical user interface to the user 116. In some embodiments, the I/O devices 518 may be physically incorporated with the tote 118 or may be externally placed.

In some implementations, where the tote 118 incorporates the optical targets 128, the I/O devices 518 may include the controller 420 as described above and one or more of the optical targets 128. The controller 420 may be configured to control the state of the one or more optical targets 128 of the tote 118.

The network interfaces 516 are configured to provide communications between the tote 118 and other devices, such as other totes 118, routers, access points 210, the servers 204, and so forth. The network interfaces 516 may include devices configured to couple to PANs, LANs, WANs, and so forth. For example, the network interfaces 516 may include devices compatible with Ethernet, Wi-Fi, Bluetooth, ZigBee, and so forth.

The tote 118 may also include one or more busses or other internal communications hardware or software that allow for the transfer of data between the various modules and components of the tote 118.

As shown in FIG. 5, the tote 118 includes one or more memories 520. The memory 520 comprises one or more CRSM as described above. The memory 520 provides storage of computer-readable instructions, data structures, program modules, and other data for the operation of the server 204. A few example functional modules are shown stored in the memory 520, although the same functionality may alternatively be implemented in hardware, firmware, or as a system on a chip (SOC).

The memory 520 may include at least one operating system (OS) module 522. The OS module 522 is configured to manage hardware resource devices such as the I/O interfaces 514, the I/O devices 518, the communication interfaces 512, and provide various services to applications or modules executing on the processors 506. The OS module 522 may implement a variant of the FreeBSD operating system as promulgated by the FreeBSD Project, other UNIX or UNIX-like variants, a variation of the Linux operating system, such as Android as promulgated by Google, Inc. of Mountain View, Calif. Other OS modules 522 may be used, such as the Windows operating system from Microsoft Corporation of Redmond, Wash., the LynxOS from LynuxWorks of San Jose, Calif., and so forth.

Also stored in the memory 520 may be a data store 524 and one or more of the following modules. These modules may be executed as foreground applications, background tasks, daemons, and so forth. The data store 524 may use a flat file, database, linked list, tree, executable code, script, or other data structure to store information. In some implementations, the data store 524 or a portion of the data store 524 may be distributed across one or more other devices including the servers 204, network attached storage devices, and so forth.

A communication module 526 may be configured to establish communications with one or more of the sensors 120, the servers 204, or other devices. The communications may be authenticated, encrypted, and so forth.

The memory 520 may also store a tote item tracking module 528. The tote item tracking module 528 is configured to maintain a tote item identifier list 530. The tote item identifier list 530 may comprise data indicating one or more items 104 associated with the tote 118. For example, the tote item identifier list 530 may indicate the items 104 present in the tote 118. The tote item tracking module 528 may generate or otherwise maintain a tote item identifier list 530. For example, the tote item tracking module 528 may receive input from a user 116 by way of a touch screen display with which the user 116 may enter information indicative of the item 104 placed in the tote 118. In another example, the tote item tracking module 528 may receive input from the I/O devices 518, such as the weight sensor 120(6) and an RFID reader 120(8). The tote item tracking module 528 may send the list of items 104 to the inventory management system 122. The tote item tracking module 528 may also be configured to receive information from the inventory management system 122. For example, a list of items 104 to be picked may be presented within a user interface on the display device 212(3) of the tote 118.

A unique identifier 532 may also be stored in the memory 520. In some implementations, the unique identifier 532 may be stored in rewritable memory, write-once-read-only memory, and so forth. For example, the unique identifier 532 may be burned into a one-time programmable non-volatile memory, such as a programmable read-only memory (PROM). In some implementations, the unique identifier 532 may be part of a communication interface 512. For example, the unique identifier 532 may comprise a media access control (MAC) address associated with a Bluetooth interface. The communication module 526, the tote item tracking module 528, or other modules may use the unique identifier 532 when communicating with other devices such as the server 204. For example, the unique identifier 532 may be used to identify data sent by the tote 118.

The memory 520 may include a display module 534. The display module 534 may be configured to present information, such as information received from the one or more servers 204 or generated onboard the tote 118. For example, the display module 534 may comprise a markup language rendering engine configured to process user interface data 536 received from the server 204 to generate a user interface. In some implementations, the display module 534 may also process input made to the user interface by way of input devices, such as the sensors 120.

Other modules 538 may also be stored within the memory 520. In one implementation, a data handler module may be configured to generate data indicative of the user 116, the tote 118, or another of one or more objects in range of the sensors 120 of the tote 118. For example, the data handler module may be configured to acquire data from one or more sensors 120 of the tote 118 and generate sensor data 540. For example, the sensor data 540 may comprise information from the magnetometer 120(12) indicative of orientation of the structure 502. The sensor data 540 may be stored in the data store 524 and may be sent to the server 204 for further processing. Other data 542 may also be stored within the data store 524. For example, configuration settings, pre-stored activation sequences, user interface preferences, item data, and so forth, may be stored within the data store 524.

The other modules 538 may also include a user authentication module which may be configured to receive input and authenticate or identify a particular user 116. For example, the user 116 may enter a personal identification number or may provide a fingerprint to a fingerprint reader to establish their identity. In implementations where the tote 118 is configured to provide one or more of the functions associated with a target assembly 126, a control module 430 as described above and the associated data may also be stored in the memory 520. For example, notification or annunciator lights on the tote 118 may be used as the optical targets 128 during the calibration process.

Figure 6:
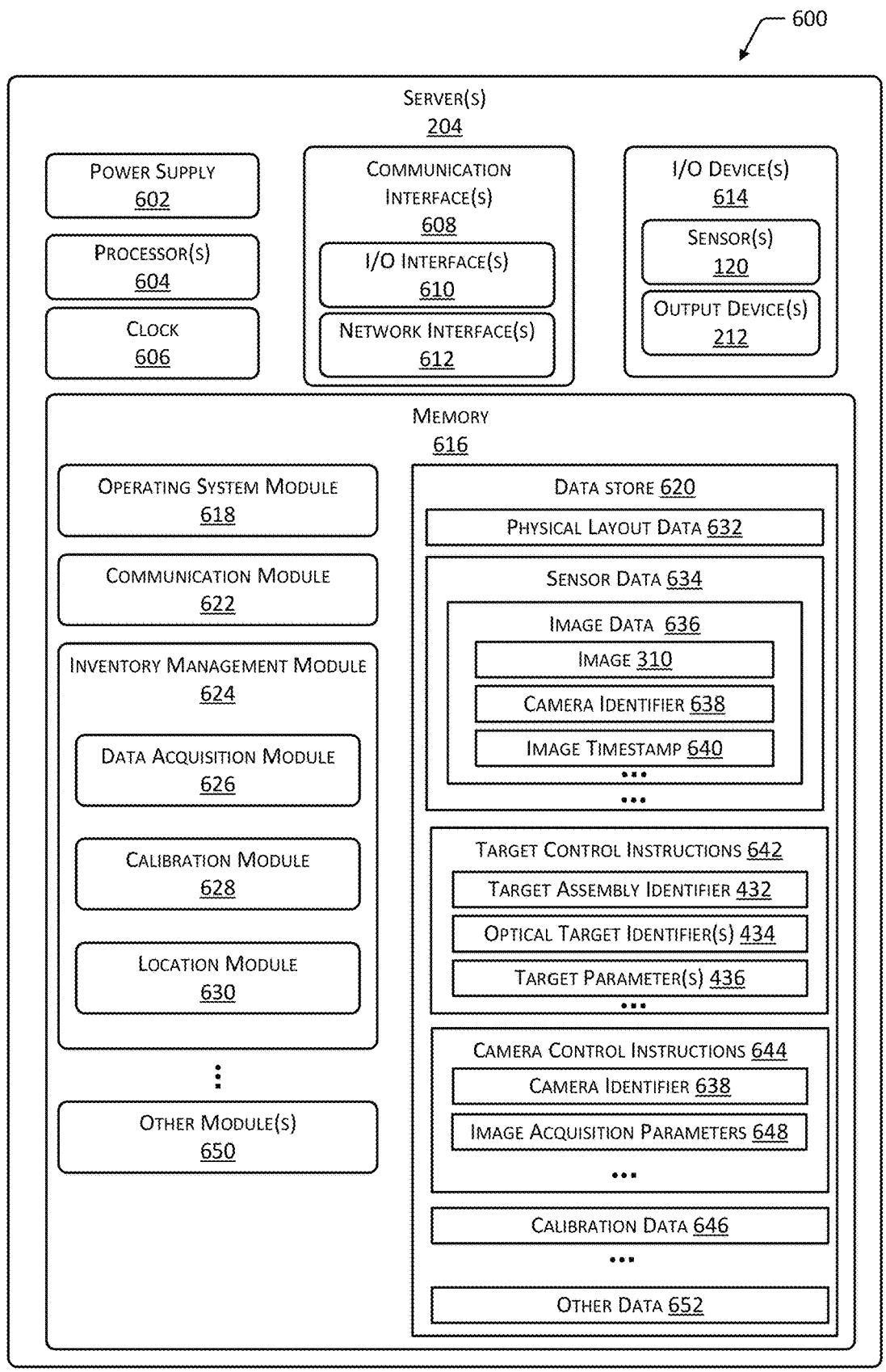
FIG. 6 illustrates a block diagram of a server configured to support operation of the facility, according to some implementations.

FIG. 6 illustrates a block diagram 600 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 602 are configured to provide electrical power suitable for operating the components in the server 204. The server 204 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to generate a timestamp for comparison with timestamps received from the cameras 120(1), trigger a preprogrammed action, and so forth.

The server 204 may include one or more communication interfaces 608 such as I/O interfaces 610, network interfaces 612, and so forth. The communication interfaces 608 enable the server 204, or components thereof, to communicate with other devices or components. The communication interfaces 608 may include one or more I/O interfaces 610. The I/O interfaces 610 may comprise I2C, SPI, USB, RS-232, and so forth.

The I/O interface(s) 610 may couple to one or more I/O devices 614. The I/O devices 614 may include input devices such as one or more of a sensor 120, keyboard, mouse, scanner, and so forth. The I/O devices 614 may also include output devices 212 such as one or more of a display, printer, audio speakers, and so forth. In some embodiments, the I/O devices 614 may be physically incorporated with the server 204 or may be externally placed.

The network interfaces 612 are configured to provide communications between the server 204 and other devices, such as the totes 118, routers, access points 210, and so forth. The network interfaces 612 may include devices configured to couple to PANs, LANs, WANs, and so forth. For example, the network interfaces 612 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 6, the server 204 includes one or more memories 616. The memory 616 comprises one or more CRSM as described above. The memory 616 provides storage of computer-readable instructions, data structures, program modules, and other data for the operation of the server 204. A few example functional modules are shown stored in the memory 616, although the same functionality may alternatively be implemented in hardware, firmware, or as a system on a chip (SOC).

The memory 616 may include at least one OS module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project, other UNIX or UNIX-like variants, a variation of the Linux operating system as promulgated by Linus Torvalds, the Windows operating system from Microsoft Corporation of Redmond, Wash., and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 204, network attached storage devices, and so forth.

A communication module 622 may be configured to establish communications with one or more of the totes 118, the sensors 120, the target assemblies 126, other servers 204, or other devices. The communications may be authenticated, encrypted, and so forth.

The memory 616 may store an inventory management module 624. The inventory management module 624 is configured to provide the inventory functions as described herein with regard to the inventory management system 122. For example, the inventory management module 624 may track items 104 between different inventory locations 114, to and from the totes 118, and so forth. This tracking may use the calibration data of the cameras 120(1) as described herein to determine a location of objects such as the items 104, users 116, totes 118, and so forth, within the real space of the facility 102.

The inventory management module 624 may include one or more of a data acquisition module 626, a calibration module 628, or a location module 630. The data acquisition module 626 may be configured to acquire and access information associated with operation of the facility 102. This information may be stored in the data store 620. The inventory management module 624 may be configured to track objects in the facility 102 using physical layout data 632 and sensor data 634.

The physical layout data 632 comprises information about the physical configuration of the facility 102 or portions thereof. For example, the physical layout data 632 may include electronic representations of the physical structures in the facility 102, such as computer aided design (CAD) data of the aisle 112 configurations, inventory locations 114, information about which items 104 are in what inventory locations 114, real coordinates of optical targets 128 built into the inventory locations 114, and so forth. The physical layout data 632 may include information about the presence of walls, heating ventilation and air conditioning (HVAC) equipment, location of doors and windows, and so forth.

The sensor data 634 comprises information acquired from, or based on, the one or more sensors 120. For example, the sensor data 634 may comprise three-dimensional information about an object in the facility 102 as acquired by the 3D sensors 120(2), or weight data as acquired by the weight sensors 120(6). The sensor data 634 may include the sensor data 440 from the target assembly 126, the sensor data 540 from the tote 118, or from sensors 120 coupled to other devices.

As described above, the sensors 120 may include cameras 120(1) configured to acquire one or more images 310. These images 310 may include individual still images, or a sequence of images such as video. The sensor data 634 may include image data 636. The image data 636 comprises the image(s) 310 as well as metadata, such as a camera identifier 638, image timestamp 640, and so forth. As described above with regard to FIG. 3, the image 310 may comprise a plurality of pixels 312 having pixel coordinates 318 and pixel values 320.

The camera identifier 638 provides information indicative of a particular camera 120(1) which has acquired the image 310. In some implementations, the calibration data as generated by the calibration module 628 may be specific to a particular camera 120(1) which is located at a particular camera location 330 in real space 304 and having particular optical characteristics. The camera identifier 638 may comprise a string, value, or other data which uniquely identifies the particular camera 120(1) from other cameras 120(1) within at least a single facility 102. In some implementations, the camera identifier 638 may be unique across all facilities 102. In one implementation, the camera identifier 638 may comprise a MAC address, such as of a network interface used by the camera 120(1) to communicate with the network 202. By using the camera identifier 638, the data acquisition module 626, the calibration module 628, and other modules are able to determine which image data 636 to use for calibrating a particular camera 120(1), which calibration data to use in subsequent non-calibration images 310, and so forth.

The image timestamp 640 provides information indicative of a time, date, tick, or other temporal or sequential information about when the image 310 was acquired. For example, the camera 120(1) may include a clock, or receive data from a clock, which generates timestamp values. The image data 636 may include other information. For example, where the camera 120(1) includes a mechanism to change the orientation, such as a pan/tilt head, the orientation of the camera 120(1) at the time of acquisition of the image 310 may be included in the image data 636. In some implementations, the image data 636 may include the camera location 330 in real coordinates. For example, the camera 120(1) may be loaded with, or may determine independently, the real coordinates corresponding to its camera location 330 in the facility 102. Subsequently, this information may be included in the image data 636. In other implementations, this information may be retrieved, such as from the physical layout data 632 during processing by the calibration module 628.

The calibration module 628 may be configured to generate target control instructions 642, camera control instructions 644, and generate calibration data 646. The target control instructions 642 are configured to be processed by the processor(s) 406 of the target assembly 126 and set particular optical targets 128 to particular output states, such as "on" or "off" in a particular order or sequence. The target control instructions 642 may include a target assembly identifier 432, optical target identifier 434, target parameters 436, or other data. The target assembly identifier 432, the optical target identifier 434, and the target parameters 436 are described above in more detail with regard to FIG. 4. The target control instructions 642 thus provide instructions or commands which may be acted upon by the target assembly 126 to control operation of the optical targets 128.

The camera control instructions 644 provide instructions or commands configured to direct one or more cameras 120(1) to one or more of acquire images 310, or return stored images acquired at a particular time or within a particular window of time. The camera control instructions 644 may include the camera identifier 638, image acquisition parameters 648, or other data. As described above, the camera identifier 638 identifies the particular camera 120(1). In some implementations, the camera identifier 638 as included in the camera control instructions 644 may indicate a range or group of cameras 120(1). The image acquisition parameters 648 may comprise information such as: a number of frames to acquire, frame rate of the images 310 to be acquired, whether to determine target pixels 314 locally on the camera 120(1), duration of exposure, zoom level, time to begin image 310 acquisition, time to end image 310 acquisition, and so forth. For example, the image acquisition parameters 648 may specify to acquire images 310 at 30 frames per second (FPS). In another example, the image acquisition parameters 648 may specify the camera 120(1) is to provide nonconsecutive images 310 to the server 204, such as only sending every third frame. In some implementations, the image acquisition parameters 648 may include a timestamp or range of timestamps indicative of a window of time in which particular images 310 are to be acquired, or for which previously acquired image data 636 as stored on the camera 120(1) is to be provided.

The calibration module 628 uses the target control instructions 642 to direct the operation of the target assemblies 126, and may use the camera control instructions 644 to direct operation of the cameras 120(1). For example, the calibration module 628 may use the target control instructions 642 to set the optical targets 128 all to a first state, such as "off" or "black". A camera control instruction 644 may then be issued to acquire an image 310 of the field of view 130 which includes the target assembly 126 with all of the optical targets 128 in the first state. The resulting image data 636 including image 310 of the optical targets 128 in the first state comprises a base image.

The calibration module 628 may then use target control instructions 642 to selectively set an individual optical target 128 to a second state, such as "on" or "white". A camera control instruction 644 may then be issued to acquire an image 310 of the field of view 130 which includes the target assembly 126 with all of the optical targets 128 in the first state except for the individual optical target 128 which is in the second state. The resulting image data 636 including this image 310 of the particular optical target 128 in the second state comprises an active image.

Given that the location of the optical target 128 remains the same during the acquisition of the base image and the active image, differences between the base image and the active image are indicative of the optical target 128. The calibration module 628 may compare the base image and the active image. For example, the calibration module 628 may subtract the active image from the base image, or vice versa. As a result of the subtraction, the pixels 312 which differ the most (such as the difference between "on" and "off", or "white" and "black") may exceed a threshold value. Referring to the example image 310 of FIG. 3, the set of target pixels 316 represent the optical target 128 which is active. In other implementations, a distance within a color space may be determined for pixels 312 between the base image and the active image. This distance may be used to determine the set of target pixels 316. For example, difference pixels having a distance in color space above or below a threshold value may be designated as the target pixels 314.

One or more filtering techniques may be used to reduce noise resulting from the comparison between the base image and the active image. Mechanical vibration, slight movements of the camera 120(1), electronic noise, movement of objects in the field of view 130, and other factors may result in noise during the comparison.

Motion detection algorithms may be used to determine motion of objects between the compared images. For example, should a certain number of pixels 312 which are clustered together differ in a pixel value 320 between the images, motion of an object may be deemed to have occurred between the images 310. The inventory management module 624 may be configured to disregard images 310 which include motion. For example, during processing by the calibration module 628, a base image and active image which indicate motion may be disregarded, and additional camera control instructions 644 to acquire further images may be generated.

By stepping through and activating individual optical targets 128 at a time and acquiring active images in which a single optical target 128 is in the second state, the timing or sequencing of the image data 636 may be used to disambiguate the particular optical target 128 which appears as the set of target pixels 316 in the image 310. For example, the calibration module 628 sends at timestamp "140527100947001" target control instructions 642 to set the particular optical target 128 to the second state for 100 ms, while maintaining other optical targets 128 in the first state. A camera control instruction 644 is sent to the camera(s) 120(1) undergoing calibration to acquire image data 636. The image data 636 is returned with an image timestamp 640 of "140527100947050", which is within the 100 ms time during which the particular optical target 128 would be active. As a result, the difference between the base image and the active image may be deemed to be due to the activation of the optical target 128 in the second state. In some implementations, an additional post-activation base image may be acquired as well, to provide an additional check against other changes within the field of view 130, such as a movement or transient changes in lighting.

In one implementation, the determination of the target pixels 314, or a set of target pixels 316, may include one or more of the following operations. Difference pixels may be generated by subtracting pixel values 320 of respective pixels 312 in the active image from the pixel values 320 of corresponding respective pixels 312 in the base image. As described elsewhere, the pixel values 320 are representative of one or more of the following: a brightness channel, a red channel, a green channel, a blue channel, and so forth. The set of target pixels 316 may comprise the difference pixels having pixel values 320 above a threshold value.

In another implementation, the determination of the pixel coordinates 318 of the target pixels 314, or the set of target pixels 316, may comprise one or more of the following operations. A first matrix comprising pixels 312 of the base image is accessed. A second matrix comprising pixels 312 of the active image is accessed. The first and second matrices may include the pixel coordinates 318 and the pixel values 320 of the pixels 312 in the respective images 310. A third matrix may be generated by subtracting at least a portion of values, such as pixel values 320, stored in the first matrix from the second matrix. In some implementations the third matrix may comprise a difference image comprising the difference pixels. One or more filter functions may be applied to the third matrix. For example, morphological filters such as dilation and erosion may be applied to the difference image which is made up of the difference pixels. The values in the third matrix corresponding to pixel coordinates 318 may be disregarded or not subtracted, and thus carried unchanged into the third matrix. For example, the portion may comprise a selected portion of the image 310, within which calibration is to take place. Continuing this example, the portion of the matrices may be representative of those pixels 312 within which an image 310 is formed, discounting pixels 312 which are along a border and as such outside of the image formation area of the optics of the camera 120(1). Difference pixels are designated as the pixels 312 represented in the third matrix, and may have a value greater than a threshold value. For example, the difference pixels may comprise those having a value or absolute value which is greater than "250". Pixel coordinates 318 of the difference pixel(s) are determined by referring to the appropriate portion of the tuple in the first or second matrix. The pixel coordinates 318 of the difference pixel(s) may be designated as the pixel coordinates 318 of the target pixel(s) 314 or the set of target pixels 316.

In some implementations, the calibration module 628 may account for a lag or latency between issuance of an instruction and the implementation of the instruction by the receiving device, such as the camera 120(1) or the target assembly 126. For example, the latency of 20 ms may be included, and this latency may be factored into the determination as to whether an action occurred during a particular window of time.

Given the known location in the form of real coordinates of the optical target location 332, and the pixel coordinates 318 of the set of target pixels 316, a relationship may be expressed between the two, forming the calibration data 646. For example, this relationship may be expressed as a transformation matrix between the two-dimensional space of the image 310 and three-dimensional real space.

In one implementation, the calibration module 628 may be configured to perform one or more of the following operations. Location data such as the real space optical target location 332 coordinates for an optical target 128 configurable to present a plurality of states may be accessed. As described above, the location data indicates coordinates of the optical target location 332 in three-dimensional space relative to a spatial origin 328. A base image acquired by a camera 120(1) viewing the optical target 128 while the optical target 128 is in a first state is accessed. For example, the image data 636 comprising the base image may be retrieved from storage. A first instruction, such as a target control instruction 642, may be sent to the target assembly 126 to set the optical target 128 to a second state. An active image acquired by the camera 120(1) viewing the optical target 128 while the optical target 128 is in the second state is accessed. Two-dimensional pixel coordinates 318 of a target pixel 314 or set of target pixels 316 corresponding to the optical target 128 in one or more of the base image, or the active image are determined. For example, as described above, the active image may be subtracted from the base image. The pixel coordinates 318 correspond to at least a portion of the optical target 128 appearing in the base image and the active image. Calibration data 646 may then be generated that relates the location data in real space, or a projection inclusive thereof, to the pixel coordinates 318.

The location module 630 may be configured to use image data 636 and the calibration data 646 to determine a location or a projection of the location of an object in real space. For example, the location module 630 may use object recognition techniques to recognize the hand of the user 116 in the image 310, and determine the projection or location of the user's 116 hand in real coordinates.

In some implementations, the location module 630 may encounter an uncertainty or may generate coordinates within a projection. The projection may comprise a solid angle which extends from the pixel(s) 312 of the imaging sensor in the camera 120(1) into real space, encompassing the location of the optical target location 332. For example, the projection may specify the X and Y coordinates in real space 304, but the location may be somewhere along the Z axis. By combining a plurality of projections resulting from image data 636 from a plurality of cameras 120(1) at different camera locations 330, real coordinates may be determined, or a volume encompassing real coordinates may be defined.

Other modules 650 may also be present in the memory 616, as well as other data 652 in the data store 620. For example, the other modules 650 may include an analysis module while the other data 652 may include item data, user data, and so forth. The analysis module may be configured to track the movement of objects, such as items 104, users 116, totes 118, and so forth, in the facility 102, using information from the location module 630. Other modules 650 may also generate the user interface data 536, process user input, process orders for pick and place, and so forth.

Figure 7:
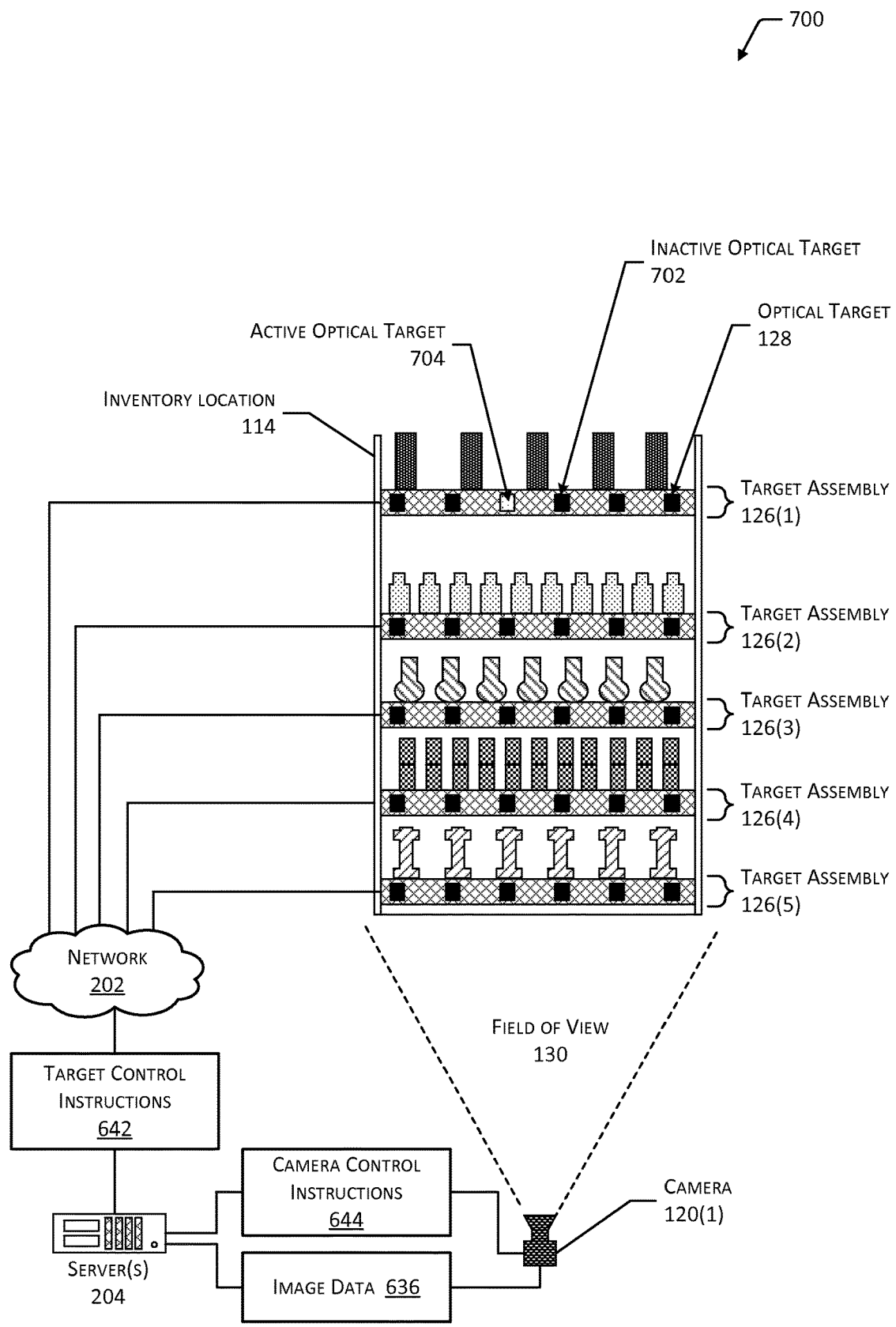
FIG. 7 illustrates a schematic of an inventory location such as a shelf with target assemblies affixed, according to some implementations.

FIG. 7 illustrates a schematic 700 of an inventory location 114 such as a shelf with target assemblies 126 affixed thereto or integral therewith, according to some implementations. The inventory locations 114 may include the target assemblies 126, such as on a shelf edge front, on support structures of the inventory location 114, on the tip of pegs suitable for hanging items 104, and so forth. In this illustration, the inventory location 114 includes five shelves. A front edge of each shelf includes a plurality of optical targets 128. In the implementation depicted here, each shelf includes a separate target assembly 126(1)-(5). In other implementations, a single target assembly 126 may include all of the optical targets 128 at the inventory location 114, such as in a shelving unit.

As described in FIG. 6, the calibration module 628 may be configured to send target control instructions 642 to instruct a particular target assembly 126 to activate a particular optical target 128. The optical targets 128 may be in a first state, such as an inactive or black. In this illustration, inactive optical targets 702 are depicted as black. The optical targets 128 may also be transitioned to at least a second state, such as active or white. In this illustration, the active optical targets 704 are depicted as white. As shown here, the target control instructions 642 have set the third optical target 128 from the left on the target assembly 126(1) to act as an active optical target 704. As described in FIG. 6, the calibration module 628 has information indicative of the position in real coordinates of the active optical target 704.

The calibration module 628 may also direct the camera 120(1) to acquire or retrieve previously acquired image data 636 by using the camera control instructions 644. As illustrated here, the target assemblies 126 may be within the field of view 130 of the camera(s) 120(1) undergoing calibration. Responsive to the camera control instructions 644, image data 636 is returned to the server 204 for processing by the calibration module 628. For example, the camera control instruction 644 or other retrieval request for image data 636 may include a timestamp for the time (actual or estimated) corresponding to when the target control instructions 642 are to (or have) activated the optical target 128. The image data 636 for one or more images 310 having an image timestamp 640 value equal to or later than the timestamp in the retrieval request may be retrieved and returned to the server 204 or other device for processing.

In some implementations, the camera(s) 120(1) may be configured to send the image data 636 to another device for storage, such as a network attached storage device. In these implementations, the camera control instructions 644 requesting image data 636 may be directed to this device for retrieval and production of the image data 636.

The calibration module 628 may be configured to generate calibration data 646 for a plurality of cameras 120(1) using a single set or sequence of target control instructions 642. For example, three cameras 120(1)(1)-120(1)(3) may have fields of view 130(1)-(3) which include at least a portion of the same target assembly 126. Image data 636 may be acquired by these three cameras 120(1)(1)-120(1)(3), and the individual respective base images and active images may be used to determine respective sets of target pixels 316 for generation of calibration data 646 for each of the cameras 120(1)(1)-120(1)(3).

Furthermore, in some implementations, where data is available indicating which fields of view 130 may include which target assemblies 126, separate target control instructions 642 may be issued such that two or more optical targets 128 are active simultaneously within the facility 102. For example, cameras 120(1)(4) and 120(1)(5) may be across the aisle 112 from one another, with field of view 130(1) directed north and field of view 130(2) directed south, respectively. Target assembly 126(6) is located on the same side of the aisle 112 as the camera 120(1)(4), but is outside of the field of view 130(1). Likewise, the target assembly 126(7) is located on the same side of the aisle 112 as the camera 120(1)(5), but is outside of the field of view 130(1). Thus, camera 120(1)(4) can see the target assembly 126(7), and camera 120(1)(5) can see the target assembly 126(6). In this configuration, optical targets 128 on the target assembly 126(7) and 126(6) may be active contemporaneously.

In other implementations, the target assemblies 126 may be incorporated into other portions of the facility 102. For example, the target assemblies 126 may be included in the floor of the facility 102, the ceiling, along walls, and so forth.

Illustrative Processes

Figure 8:
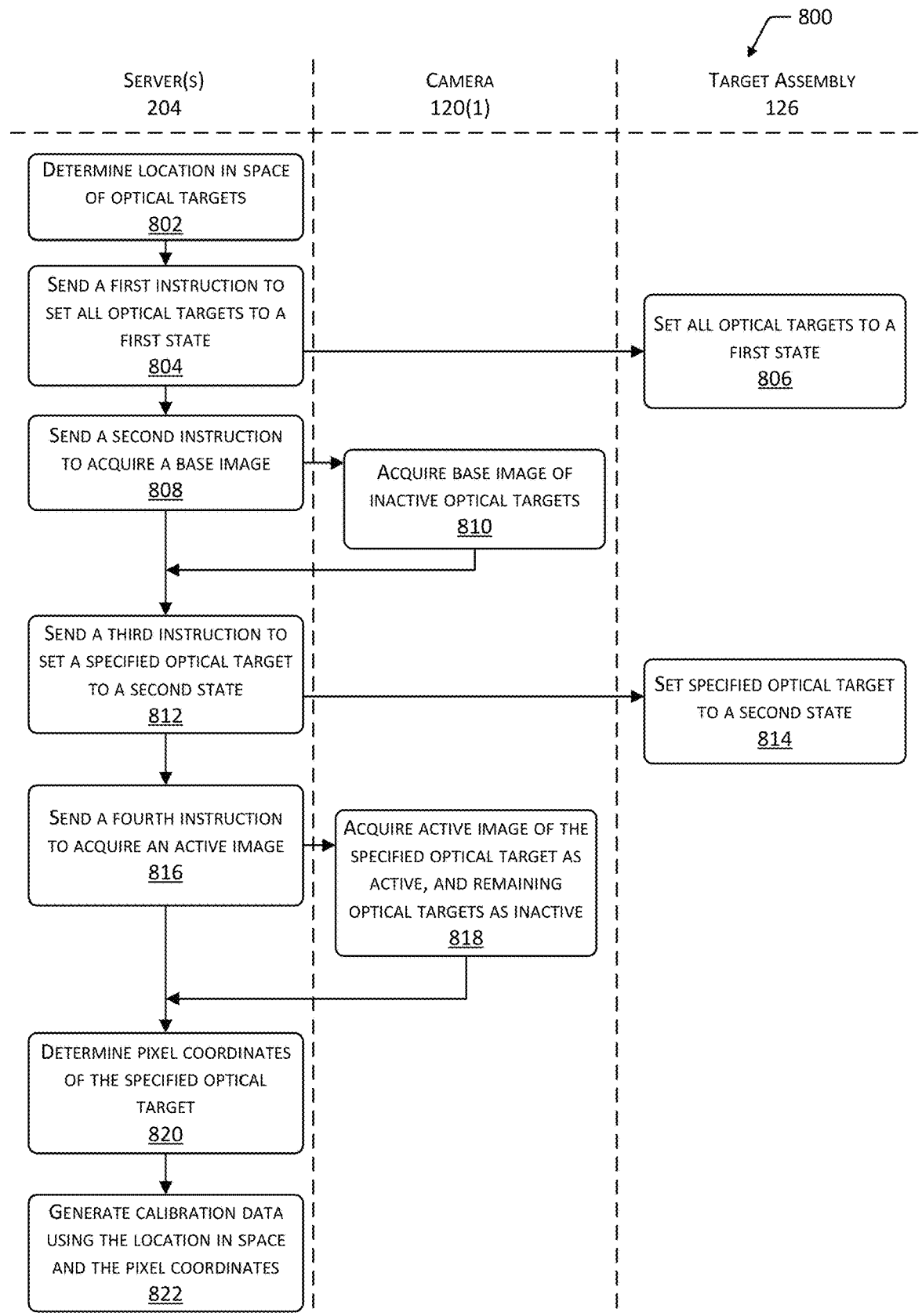
FIG. 8 depicts a flow diagram of a process for generating calibration data that relates pixel coordinates of the camera to real coordinates in 3D space, according to some implementations.

FIG. 8 depicts a flow diagram 800 of a process for generating calibration data 646 that relates pixel coordinates of the camera to real coordinates in 3D space, according to some implementations. In this illustration, three devices are depicted: the server 204, the camera 120(1) undergoing calibration, and the target assembly 126. Single devices are illustrated and described for ease of discussion and not by way of limitation. For example, a plurality of cameras 120(1) may be calibrated simultaneously, or a plurality of target assemblies 126 may be used during calibration of one or more cameras 120(1). In some implementations, the process may be performed at least in part by the inventory management module 624.

In this illustration, blocks 802, 804, 808, 812, 816, 820, and 822 may be performed at least in part by the server 204. Blocks 806 and 814 may be performed at least in part by the target assembly 126. Blocks 810 and 818 may be performed at least in part by the camera 120(1).

Block 802 determines a location in space of one or more of the optical targets 128. In one implementation, the determination of location may include accessing the real space coordinates of the optical targets 128, such as stored in the physical layout data 632.

In another implementation, the location in space may be determined using another sensor 120. For example, a 3D sensor 120(2) such as a lidar may be used to scan for reflectors which are proximate to the optical targets 128 or mounted at particular locations such as reference points on the structure 402 of the target assembly 126. Coordinates of these reference points on the target assembly 126 may be used in conjunction with a model of the target assembly 126, such as CAD data. The model may comprise a three-dimensional representation of the target assembly 126, including the spatial locations of the optical targets 128 thereon. By using the reference coordinates and the model, the known location for one or more of the optical targets 128 on the target assembly 126 may be generated.

In yet another implementation, the location may be manually entered, determined by way of inertial navigation, and so forth. For example, the target assembly 126 may include one or more of accelerometers 120(10), gyroscopes 120(11), or magnetometers 120(12) to generate information about motion of the target assembly 126. This information about motion may be used to determine a location in real space relative to a known location based on integration of the motions associated with the movement of the target assembly 126.

Block 804 sends a first instruction to one or more target assemblies 126. The first instruction may comprise target control instructions 642. For example, the first instruction may set all of the optical targets 128 of the one or more target assemblies 126 to a first state, such as "off" or "inactive".

At the target assembly 126, responsive to the first instruction, block 806 sets the one or more optical targets 128 as designated by the target control instructions 642 to the specified state. Continuing the example, the first instruction may direct the controller 420 to set all of the optical targets 128 of the one or more target assemblies 126 to the first state.

Block 808 sends a second instruction to acquire a base image. For example, the second instruction may comprise camera control instructions 644. The camera control instructions 644 as described above may be configured to acquire image data 636 or retrieve previously acquired image data 636. In this illustration, the second instruction may be sent to the camera 120(1).

At the camera 120(1), indicated by the camera identifier 638 of the camera control instructions 644, block 810 acquires the base image of the optical targets 128 in their first state. The image data 636 comprising the base image may be returned to the server 204.

Block 812 sends a third instruction to set the specified optical target 128 of the one or more target assemblies 126 to a second state. The second state may comprise an "on" or "active" configuration of the optical target 128. For example, the third set of instructions may comprise target control instructions 642 which designate a particular optical target 128 by using the optical target identifier 434 associated therewith.

At the target assembly 126, responsive to the third instruction, block 814 sets the optical target 128 designated by the target control instructions 642 to the specified state. Continuing the example, the third instruction may direct the controller 420 to set one of the optical targets 128 of the one or more target assemblies 126 to the second state.

Block 816 sends the camera 120(1) a fourth instruction to acquire an active image. As described above, the active image comprises image data 636 in which the image 310 includes one or more pixels 312 showing the active optical target 704.

At the camera 120(1), indicated by the camera identifier 638 of the camera control instructions 644, block 818 acquires the active image of the particular optical target 128 in the second state and the remaining optical targets 128 which are still in the first state. The image data 636 comprising the active image may be returned to the server 204.

Block 820 determines pixel coordinates 318 of the specified optical target 128. For example, the pixel coordinates 318 of the target pixel 314 or set of target pixels 316 may be determined by subtracting the active image from the base image, or otherwise comparing the pixels 312 in the two or more images 310. One process for determining the target pixel 314 or set of target pixels 316 by image subtraction is discussed in more detail below with regard to FIG. 9. Should the determination of the target pixel 314 or set of target pixels 316 be ambiguous or inconclusive, the images 310 may be discarded and new images 310 may be acquired.

In some implementations motion detection techniques may be used to determine when motion occurs between the images 310, such as between the base image and the acquisition of the active image. The images 310 which exhibit motion may be discarded and other images 310 acquired and used for the process. For example, should block 820 determine motion between the base image and the active image, the process may return to block 804. The motion detection may involve a comparison between the base image and the active image, input from another sensor 120, and so forth.

Block 822 generates calibration data 646 using the location in real space 304 determined by block 802 and the pixel coordinates 318 of the target pixel 314 or set of target pixels 316 as determined by block 820. In some implementations, calibration data 646 may comprise a transformation matrix that associates pixel coordinates 318 with particular real coordinates in real space 304 or a projection which is inclusive thereof.

Acquisition of additional target pixels 314 or sets of target pixels 316 may improve the calibration data 646. In some implementations, at least a portion of the process may iterate to acquire information about three or more target pixels 314 or sets of target pixels 316. While the process depicts a single pass, it is understood that one or more portions of the process may be repeated or iterated. For example, the process may iterate blocks 812 through 820 four times to acquire the base image and four active images of four different optical targets 128.

Figure 9:
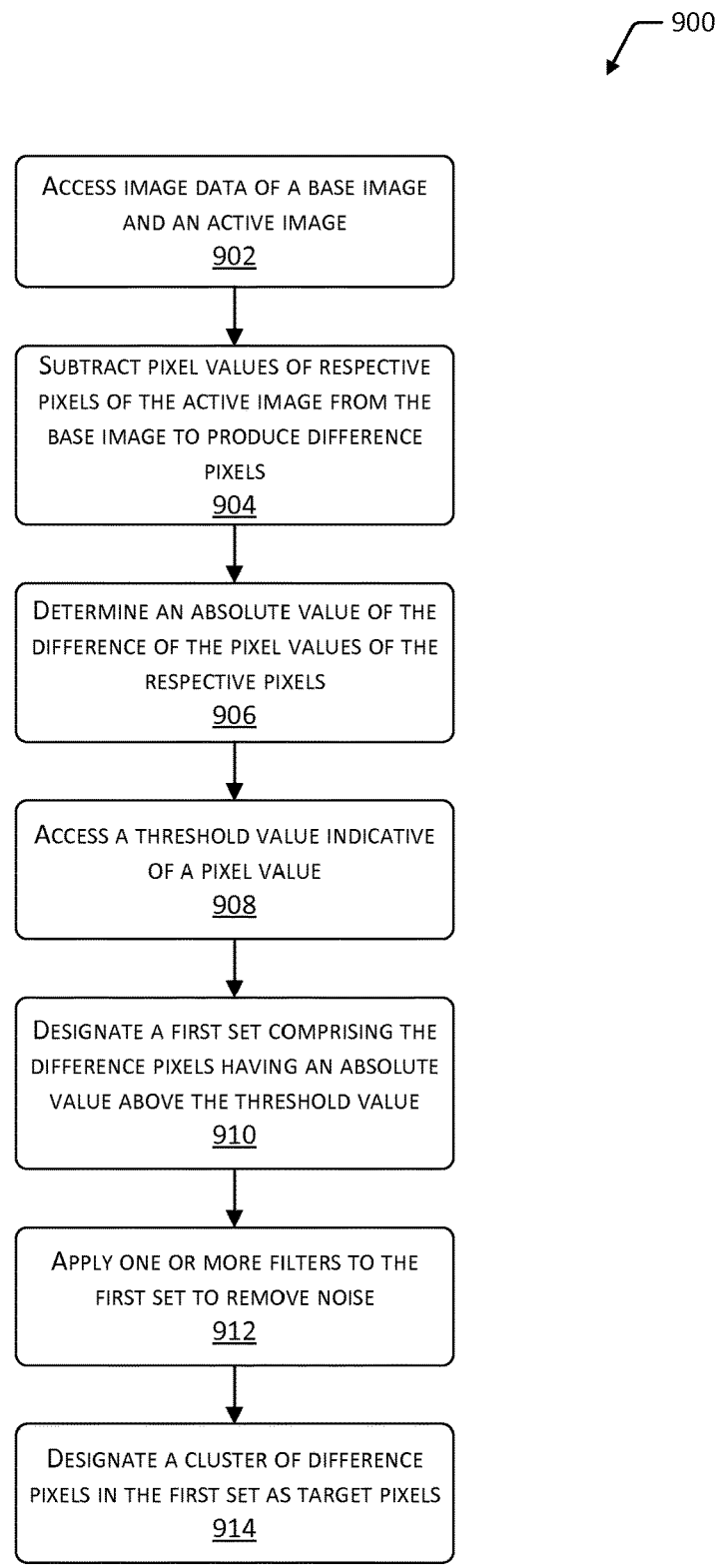
FIG. 9 depicts a flow diagram of a process for determining pixels in the image associated with the optical target, according to some implementations.

FIG. 9 depicts a flow diagram 900 of a process for determining target pixels 314 in the images 310 which are associated with the optical target 128, according to some implementations. In some implementations, the process may be performed at least in part by the inventory management module 624.

Block 902 accesses image data 636 of a base image and an active image. As described above, the base image and the active image differ in that at least one of the optical targets 128 manifests a different state between the two images. For example, the base image may have all the optical targets 128 in a first state, while the active image may have one of the optical targets 128 in a second state.

Block 904 subtracts pixel values 320 of the active image from the base image to produce difference pixels. For example, the pixel value 320 may comprise intensity in a monochrome image 310. Continuing the example, a pixel 312 in the base image may exhibit an intensity of "1" while the same pixel 312 in the active image exhibits an intensity of "251". As result, for the particular pixel 312, the difference of the pixel value is −250 (1−251=−250). The subtraction operation may be applied to all or a portion of the pixels 312. After the subtraction operation, the pixel coordinates 318 remain unaffected while the pixel value 320 comprises the difference.

As described above, in some implementations, the pixel values 320 may be representative of one or more of a brightness channel, a red channel, a green channel, a blue channel, a luminance channel, a chrominance channel, and so forth.

In some implementations, the pixel values 320 may be limited to a nonzero value. For example, the monochrome image 310 using 8 bits to encode intensity grayscale may only recognize values which are greater than or equal to zero and less than or equal to 255. In such implementations, block 906 may determine an absolute value of the difference of the pixel values 320 of the respective pixels. Continuing the example above, the difference of the pixel value 320 of −250 may be operated on as |−250|=250, resulting in a value of 250.

Block 908 accesses a threshold value indicative of a pixel value 320 which is deemed representative of a target pixel 314. For example, the threshold value may indicate that difference values greater than or equal to 200 are deemed indicative of a target pixel 314. The threshold value may be predetermined and preset, or may be dynamically adjusted. For example, in some implementations, the threshold value may start at a high-value such as 255 and be decremented until a threshold number of target pixels 314 have been detected.

In other implementations, instead of, or in addition to, the threshold value, particular patterns or arrangements of pixels 312 may be determined in the image 310. For example, where the optical target 128 comprises a design in the shape of a "+" or cross, the set of target pixels 316 may include those which exhibit the same or a similar shape.

Block 910 designates a first set of comprising the difference pixels having an absolute value above the threshold value. Continuing the example as illustrated in FIG. 3, the four pixels exhibit a difference in pixel value 320 between the base image and the active image. The difference has an absolute value which is greater than or equal to the threshold of 200, and thus these pixels are designated for inclusion in the first set.

Block 912 may apply one or more filters to the first set. These filters may be configured to reduce noise in the difference image which comprises the difference pixels. For example, variations other than those resulting from the active optical target 128 may be present in the base image and the active image due to vibration, electrical noise, and so forth. In some situations, the noise appears as a "salt and pepper" effect on a resulting image. For example, morphological filters such as dilation and erosion may be applied to the pixels in the first set to reduce noise.

Block 914 designates a cluster of difference pixels in the first set as target pixels 314. A cluster analysis looks for groupings or clumps of pixels proximate to one another. In the implementation described above where a single optical target 128 is active in each active image, the target pixels 314 should correspond to a single cluster of difference pixels. Block 914 may determine and analyze the clusters to determine which cluster corresponds to the optical target 128, and thus has the target pixels 314. For example, the clusters may be ranked by size, and the largest cluster having the greatest number of difference pixels may be selected and designated as the target pixels 314. In another example a minimum and maximum number of pixels may be used to discard clusters corresponding to noise and motion between the images. In another example, the presence of more than one cluster may result in the block discarding the base image and active image, and accessing or acquiring an additional base image and active image.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   accessing location data for first and second optical targets, the first and second optical targets configurable to present a plurality of states, wherein the location data indicates three-dimensional (3D) coordinates of at least a portion of the first and second optical targets;
   accessing a first image acquired by a camera viewing the first and second optical targets while the first and second optical targets are in a first state;
   sending a first instruction to set the first optical target to a second state according to a first pattern;
   accessing a second image acquired by the camera viewing the first and second optical targets while the first optical target is in the second state and the second optical target is in the first state;
   generating a third image by subtracting at least a portion of pixel values in the first image from the second image;
   based on the third image, determining first pixel coordinates of the first optical target using the first image and the second image;
   generating calibration data that relates the 3D coordinates of the at least a portion of the first optical target to the first pixel coordinates of the first optical target and a timestamp associated with a time when the first optical target is in the second state and the second optical target is in the first state;
   sending a second instruction to return the first optical target to the first state and set the second optical target to the second state according to a second pattern;
   accessing a fourth image acquired by the camera viewing the first and second optical targets while the second optical target is in the second state and the first optical target is in the first state; and
   determining second pixel coordinates of the second optical target using the fourth image.

2. The method of claim 1, wherein the first instruction comprises data indicative of one or more of:
   a first optical target identifier designating the first optical target;
   the first state or the second state;
   the timestamp; or
   a time duration to maintain the first optical target in the second state.

3. The method of claim 1, the determining the first pixel coordinates of the first optical target comprising:
   designating as the first pixel coordinates of the first optical target coordinates of pixels in the third image having a value greater than a threshold value.

4. The method of claim 3, further comprising:
   applying a morphological filter configured to provide one or more of dilation or erosion to at least a portion of the third image, wherein:
   dilation comprises addition of pixels to a boundary of an object in the third image, and
   erosion comprises removal of pixels from the boundary of the object in the third image.

5. The method of claim 1, further comprising:
   before accessing the first image:
      sending a third instruction to set the first optical target to the first state;
      sending a fourth instruction to the camera to acquire the first image; and
   before accessing the second image, sending a fifth instruction to the camera to acquire the second image.

6. The method of claim 1, the generating the calibration data that relates the 3D coordinates of the at least a portion of the first optical target to the first pixel coordinates of the first optical target and the timestamp comprising:
   generating a transformation matrix that maps the 3D coordinates of the at least a portion of the first optical target to the first pixel coordinates of the first optical target.

7. A system comprising:
   a target assembly comprising a plurality of optical targets, wherein each of the plurality of optical targets is at a known location in three-dimensional space and is configurable between a plurality of states;
   a camera configured to acquire images of at least a portion of the plurality of optical targets; and
   a computing device comprising:
      a first communication interface in communication with one or more of the target assembly or the camera;
      a first memory, storing first computer-executable instructions; and
      a first hardware processor in communication with the first memory, wherein the first hardware processor is configured to execute the first computer-executable instructions to:
         send a first set of instructions to the target assembly, wherein the first set of instructions direct the target assembly to set the plurality of optical targets to a first state of the plurality of states;
         access a first image acquired by the camera, wherein the first image comprises first pixels depicting at least a portion of the plurality of optical targets in the first state;
         send a second set of instructions to the target assembly, wherein the second set of instructions direct the target assembly to set a first optical target of the plurality of optical targets to a second state of the plurality of states for a first period of time;
         access a second image acquired by the camera, wherein the second image comprises second pixels depicting the at least a portion of the plurality of optical targets while the first optical target is in the second state and all other optical targets in the plurality of optical targets are in the first state;
         determine pixel coordinates representative of the first optical target using the first image and the second image;
         generate calibration data using the pixel coordinates of the first optical target, the known location in three-dimensional space of the first optical target, and a timestamp associated with the first period of time when the first optical target is in the second state and all other optical targets in the plurality of optical targets are in the first state;

send a third set of instructions to the target assembly, wherein the third set of instructions direct the target assembly to return the first optical target to the first state and set a second optical target of the plurality of optical targets to the second state for a second period of time;

access a third image acquired by the camera, wherein the third image comprises third pixels depicting the at least a portion of the plurality of optical targets while the second optical target is in the second state and all other optical targets in the plurality of optical targets are in the first state; and determine second pixel coordinates representative of the second optical target using the third image.

8. The system of claim 7, wherein the first image and the second image comprise pixels; and further wherein the determining the pixel coordinates representative of the first optical target comprises instructions to:

generate difference pixels by subtracting the first image from the second image;

designate as target pixels the difference pixels having a pixel value greater than a threshold value; and designate one or more pixel coordinates of the target pixels as the first pixel coordinates representative of the first optical target.

9. The system of claim 8, wherein the pixel coordinates representative of the first optical target indicate placement of a pixel within a two-dimensional image; and the pixel value is representative of one or more of:
a brightness channel,
a red channel,
a green channel,
a blue channel,
a luminance channel, or
a chrominance channel.

10. The system of claim 7, wherein the first optical target comprises one or more of:
a light emitting diode,
a light emitting quantum dot,
a fluorescent light,
an electroluminescent light,
an electrophoretic element,
a liquid crystal element,
a microelectromechanical element, or
a mechanical flag; and the first computer-executable instructions further comprising instructions to:
determine apparent motion between the first image and the second image; and
discard the first image and the second image.

11. The system of claim 7, the target assembly further comprising one or more inventory locations configured to store one or more items.

12. The system of claim 7, wherein the first set of instructions are configured to:
set the plurality of optical targets to the first state; and
maintain the first state for a predetermined period of time.

13. The system of claim 7, wherein the first optical target comprises an infrared light emitter, and further wherein:
the infrared light emitter is inactive in the first state; and
the infrared light emitter is active and emitting unmodulated light in the second state.

14. The system of claim 7, wherein the first computer-executable instructions are further configured to:
send a fourth set of instructions to the camera, wherein the fourth set of instructions direct the camera to acquire one or more of the first image or the second image.

15. The system of claim 7, wherein the first computer-executable instructions are further configured to:
determine the timestamp; and
retrieve one or more images having an image timestamp value equal to or later than the timestamp.

16. A method comprising:

accessing location data indicative of a location in three-dimensional (3D) space of a plurality of optical targets with respect to a facility;

configuring the plurality of optical targets to present a first state;

acquiring, while the plurality of optical targets are in the first state, a first image of at least a portion of the plurality of optical targets using a first camera viewing the plurality of optical targets, wherein the first image comprises first pixels depicting the at least a portion of the plurality of optical targets in the first state;

configuring a first optical target of the plurality of optical targets to present a second state for a first period of time;

acquiring, while the first optical target is in the second state and all other optical targets in the plurality of optical targets are in the first state, a second image of the at least a portion of the plurality of optical targets using the first camera viewing the plurality of optical targets, wherein the second image comprises second pixels depicting the at least a portion of the plurality of optical targets while the first optical target is in the second state and all other optical targets in the plurality of optical targets are in the first state;

determining pixel coordinates representative of the first optical target in the second image;

generating first calibration data that relates the location of the first optical target in 3D space with the pixel coordinates representative of the first optical target and a timestamp associated with the first period of time when the first optical target is in the second state and all other optical targets in the plurality of optical targets are in the first state;

associating the first calibration data and the first camera used to acquire the first image;

configuring the first optical target to present the first state and a second optical target of the plurality of optical targets to present the second state for a second period of time;

acquiring, while the second optical target is in the second state and all other optical targets in the plurality of optical targets are in the first state, a third image of the at least a portion of the plurality of optical targets using the first camera viewing the plurality of optical targets, wherein the third image comprises third pixels depicting the at least a portion of the plurality of optical targets while the second optical target is in the second state and all other optical targets in the plurality of optical targets are in the first state; and determining second pixel coordinates representative of the second optical target in the third image.

17. The method of claim 16, further comprising:
generating difference pixels by subtracting the first image from the second image;
designating as first target pixels the difference pixels having a pixel value greater than a threshold value; and
designating one or more pixel coordinates of the first target pixels as the pixel coordinates representative of the first optical target.

18. The method of claim 16, the configuring the plurality of optical targets to present the first state comprising:
generating a first instruction;
sending the first instruction to a controller of each of the plurality of optical targets; and
executing, using the controller, the first instruction.

19. The method of claim 16, the generating the first calibration data further comprising:
generating a transformation matrix that maps the location in 3D space of the first optical target as indicated by the location data to the pixel coordinates of the first optical target.

20. The method of claim 16, further comprising:
maintaining the plurality of optical targets in the first state and the second optical target in the second state for the second period of time; and
wherein the acquiring the third image occurs at least in part during the second period of time.

\* \* \* \* \*

UNITED STATES PATENT AND TRADEMARK OFFICE
CERTIFICATE OF CORRECTION

PATENT NO. : 10,885,632 B1
APPLICATION NO. : 14/471612
DATED : January 5, 2021
INVENTOR(S) : Joachim Sebastian Stahl Page 1 of 1

It is certified that error appears in the above-identified patent and that said Letters Patent is hereby corrected as shown below:

In the Claims
Column 35, Claim 8, Line 26:
Currently reads: pixels as the first pixel coordinates representative of the"
Where it should read: --pixels as the pixel coordinates representative of the--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*